US011290783B2

(12) United States Patent
Neumann et al.

(10) Patent No.: US 11,290,783 B2
(45) Date of Patent: Mar. 29, 2022

(54) REAL-TIME RECOMMENDATIONS FOR ALTERING CONTENT OUTPUT

(71) Applicant: Comcast Cable Communications, LLC, Philadelphia, PA (US)

(72) Inventors: Jan Neumann, Arlington, VA (US); Sridhar Alla, Arlington, VA (US); Oliver Jojic, Annandale, VA (US); Shekhar Agrawal, Fairfax, VA (US); Ehsan Younessian, Washington, DC (US); Amit Bagga, Basking Ridge, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 621 days.

(21) Appl. No.: 15/073,214

(22) Filed: Mar. 17, 2016

(65) Prior Publication Data

US 2016/0274744 A1 Sep. 22, 2016

Related U.S. Application Data

(60) Provisional application No. 62/134,448, filed on Mar. 17, 2015.

(51) Int. Cl.
*H04N 21/466* (2011.01)
*H04N 21/258* (2011.01)
*H04N 21/472* (2011.01)
*H04N 21/25* (2011.01)

(52) U.S. Cl.
CPC ....... *H04N 21/4668* (2013.01); *H04N 21/252* (2013.01); *H04N 21/25891* (2013.01); *H04N 21/47202* (2013.01)

(58) Field of Classification Search
CPC .......... H04N 21/25891; H04N 21/252; H04N 21/44222; H04N 21/44204
See application file for complete search history.

(56) References Cited

U.S. PATENT DOCUMENTS

| 8,843,430 B2 | 9/2014 | Jojic et al. | |
|---|---|---|---|
| 2002/0174428 A1* | 11/2002 | Agnihotri | H04N 7/163 725/46 |
| 2007/0169148 A1* | 7/2007 | Oddo | H04N 5/44543 725/46 |
| 2008/0134043 A1* | 6/2008 | Georgis | G06F 17/30035 715/733 |
| 2008/0177623 A1* | 7/2008 | Fritsch | G06Q 10/0633 705/7.27 |

(Continued)

OTHER PUBLICATIONS

Scharrenbach, Thomas, et al. "ViSTA-TV: Video Stream Analytics for Viewers in the TV Industry," 18 pages (2012).

(Continued)

*Primary Examiner* — Justin S Lee
(74) *Attorney, Agent, or Firm* — Banner & Witcoff, Ltd.

(57) ABSTRACT

According to some aspects described herein, content and service providers in a media delivery network may provide improved recommendations and/or personalize a user's experience based on the real-time activity of that user as well as other users. In this way, ever increasing amounts of content may be optimally managed in a way that provides users with the improved and/or personalized experience.

20 Claims, 15 Drawing Sheets

(56) References Cited

U.S. PATENT DOCUMENTS

| | | | |
|---|---|---|---|
| 2009/0192670 A1* | 7/2009 | Hara | B60R 16/037 |
| | | | 701/36 |
| 2009/0248607 A1 | 10/2009 | Eggink et al. | |
| 2010/0251305 A1* | 9/2010 | Kimble | H04N 21/4826 |
| | | | 725/46 |
| 2011/0040756 A1* | 2/2011 | Jones | G06F 17/30864 |
| | | | 707/737 |
| 2011/0069940 A1* | 3/2011 | Shimy | H04N 5/44543 |
| | | | 386/296 |
| 2012/0066707 A1* | 3/2012 | Poder | G08B 25/008 |
| | | | 725/14 |
| 2012/0198491 A1* | 8/2012 | O'Connell | G06F 21/316 |
| | | | 725/30 |
| 2013/0031266 A1* | 1/2013 | Gilson | G11B 27/005 |
| | | | 709/232 |
| 2013/0081084 A1* | 3/2013 | Scheer | H04N 21/2408 |
| | | | 725/46 |
| 2013/0339991 A1* | 12/2013 | Ricci | H04N 21/44204 |
| | | | 725/14 |
| 2014/0067828 A1* | 3/2014 | Archibong | H04L 65/4084 |
| | | | 707/748 |
| 2014/0067961 A1* | 3/2014 | Archibong | H04L 65/4084 |
| | | | 709/205 |
| 2014/0068647 A1* | 3/2014 | Nam | H04H 60/65 |
| | | | 725/14 |
| 2014/0075314 A1* | 3/2014 | Bachman | G06F 3/0482 |
| | | | 715/716 |
| 2014/0122590 A1* | 5/2014 | Svendsen | H04N 21/252 |
| | | | 709/204 |
| 2014/0207811 A1* | 7/2014 | Kim | H04N 21/44204 |
| | | | 707/758 |
| 2014/0358566 A1* | 12/2014 | Zhang | G11B 27/00 |
| | | | 704/500 |
| 2014/0380359 A1* | 12/2014 | Musil | H04N 21/6582 |
| | | | 725/34 |
| 2015/0135329 A1* | 5/2015 | Aghasaryan | H04L 67/306 |
| | | | 726/26 |
| 2015/0181151 A1* | 6/2015 | Nguyen | H04N 5/4403 |
| | | | 348/565 |
| 2015/0293744 A1* | 10/2015 | Bae | H04N 21/42225 |
| | | | 381/105 |
| 2015/0347416 A1* | 12/2015 | Lin | H04N 21/2187 |
| | | | 707/751 |
| 2015/0350709 A1* | 12/2015 | Tomita | G06Q 10/02 |
| | | | 725/32 |
| 2016/0073166 A1* | 3/2016 | Hu | G06F 16/48 |
| | | | 725/20 |
| 2016/0321736 A1* | 11/2016 | Andersen | G06Q 30/0631 |
| 2017/0013312 A1* | 1/2017 | Salomons | H04N 21/64322 |
| 2018/0014078 A1* | 1/2018 | Berner | H04N 21/4826 |

OTHER PUBLICATIONS

Lambda Architecture, "What is the Lambda Architecture?," 3 pages (Mar. 10, 2015).
Carr, David "Giving Viewers What they Want," 4 pages (Feb. 24, 2013).
Chang, Ray, et al. "Consumer Micro-Behavior and TV Viewership Patterns: Data Analytics for the Two-Way Set-Top Box," 8 pages.
Harris, D "Netflix analyzes a lot of data about your viewing habits," 5 pages (Jun. 14, 2012).
Murdoch, Robin, et al. "The eyes have it Guess who controls the future of TV," 5 pages (Feb. 2013).
Leonard, Andrew. "How Netflix is Turning Viewers into Puppets," 6 pages (Feb. 1, 2013).
University of Zurich. "Video Stream Analytics for the TV Industry," 1 page (Jun. 1, 2012).
Kiji "About the Kiki Project," 4 pages (Jan. 12, 2015).
Rare Mile Technologies "User Segmentation Based on TV Viewing Patters," 3 pages (Jan. 20, 2015).

* cited by examiner

REAL-TIME RECOMMENDATIONS FOR ALTERING CONTENT OUTPUT

CROSS-REFERENCE TO RELATED APPLICATIONS

This application claims priority as a non-provisional of U.S. Prov. Pat. App. Ser. No. 62/134,448, entitled "Real-Time Recommendations and Personalizations," filed on Mar. 17, 2015, the entirety of which is incorporated herein by reference.

BACKGROUND

With the ever increasing availability of media content, users encounter an overwhelming number of options when deciding what content to consume. For example, modern cable networks may have 500 or more channels and more than a hundred thousand on-demand offerings. Faced with this, users may have difficulty identifying and locating suitable content. Service providers have attempted to address this through categorized menus and featured collections of content. However, these categories and collections may do a poor job capturing the nuanced tastes of users and require that the user spend significant effort searching through the collections to find content that meets his taste.

Content and service providers may gather statistics regarding the performance of programs and other media. Existing systems may apply to a small sample of the viewing population. However, results from these techniques do not accurately identify the media and user contexts associated with user events. These and other shortcomings are addressed by the present disclosure.

SUMMARY

The following summary is for example purposes only, and is not intended to limit or constrain the detailed description.

According to some aspects described herein, content providers and service providers may provide improved recommendations and/or personalize a user's experience based on the real-time activity of that user as well as other users. For example, users may be grouped into clusters of users and/or user-clusters, and real-time activity information may be used to identify trends in those clusters. According to some aspects, these cluster trends may be used to generate content recommendations better tailored to the preferences of the user. The recommendations may be further refined or tailored based on additional information, such as media context and user context information.

To create user-clusters, historical usage information for users in a network may be assessed in order to identify common interests, preferences, and/or characteristics. For example, common characteristics may be used to generate clusters of users based on similarities found in those common characteristics. Any given user may belong to one or more clusters based on, for example, the common characteristics.

The real-time activity information may be used to identify trends for each cluster, to dynamically adjust clusters, and/or to make recommendations for a user and/or other users with similar preferences. The real-time activity information may include user control command, such as volume adjustments, channel switching, pause, fast forward, rewind, mute, and/or other related commands. For example, by identifying real-time user control command trends in a cluster, the system may make recommendations to other users in the same cluster to execute similar commands.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is presented by way of example, and not limited by, the accompanying drawings in which like numerals indicate similar elements.

DETAILED DESCRIPTION

Figure 1:
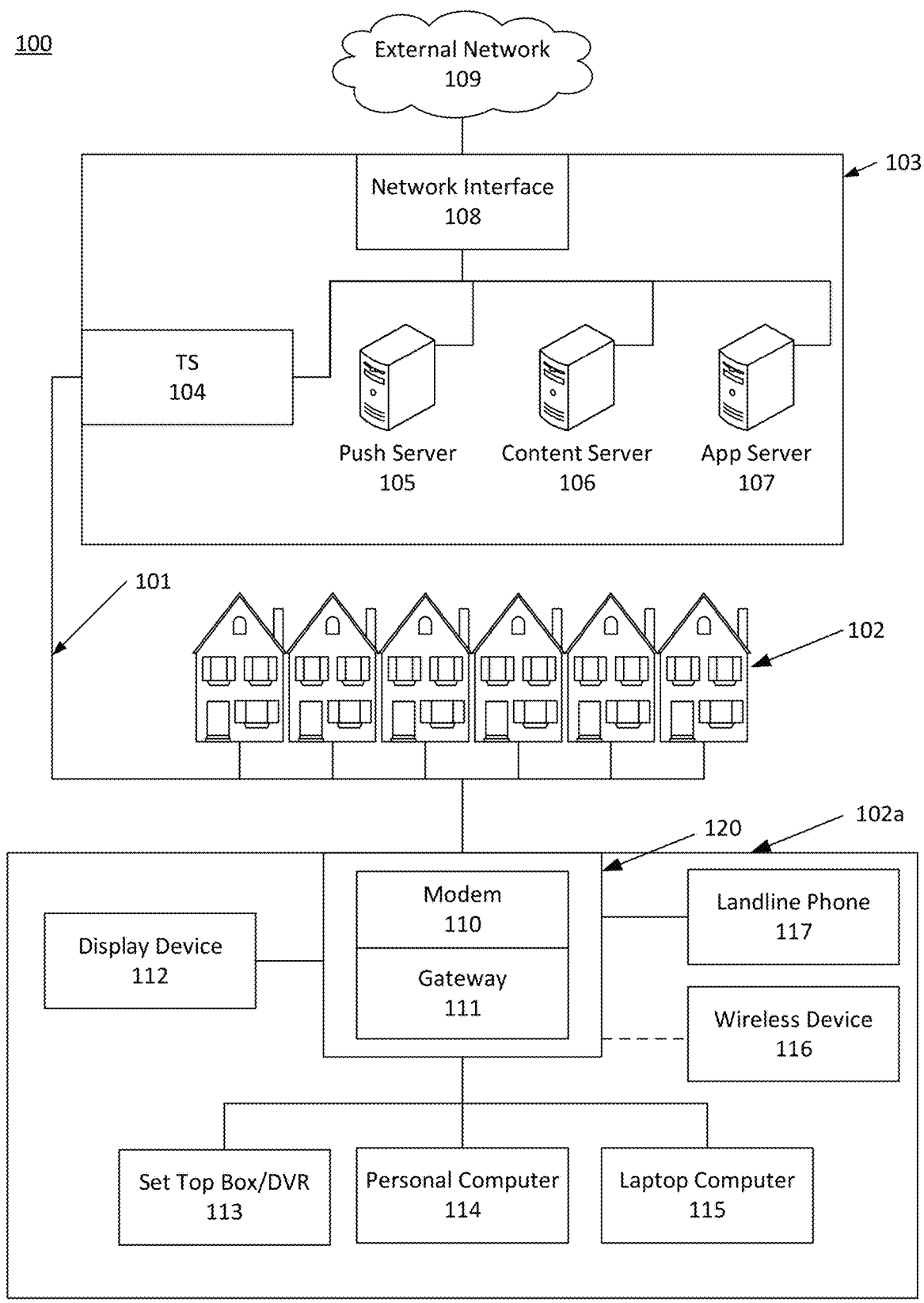
FIG. 1 shows an example communication network on which various features described herein may be implemented.

In the following description of various examples, reference is made to the accompanying drawings, which form a part hereof, and in which show various examples by which aspects of the disclosure may be practiced. It is to be understood that other examples may be utilized and structural and functional modifications may be made, without departing from the scope of the present disclosure.

According to some aspects described herein, content and service providers in a media delivery network may provide improved recommendations and/or personalize a user's experience based on the real-time (e.g. current) activity of that user as well as other users. Information collected in real-time may relate to a current interaction session of a user and may be processed as it is received rather than merely stored for future batch processing. For example, aspects and features described herein may be implemented in a cable television network to provide improved recommendations for users regarding live, recorded, and/or on-demand programming. As other examples, aspects and features described herein may be implemented in wireless networks, fiber networks, satellite networks, and/or any suitable delivery network. A recommendation system may track usage information regarding (1) what the user is doing and/or (2) what content is being viewed by the user. Information regarding the user's control commands and time spent viewing, consuming, receiving, using, and/or experiencing content may be collected in real-time and used to dynamically adjust models and recommendations for the user on the fly. This information may be further enhanced through context information regarding the current content of a viewed program or content item to provide audio/video context to the user's actions. For example, a channel change event may be associated with a fragment of a news program occurring 4:33 into the program when a car chase was being shown. By combining media context information with usage events, the recommendation system may be able to make fine-grained determinations regarding user preferences. For example, the system may determine that the user tuned away from a program when an unpopular actor appeared on the screen or when a violent scene was displayed.

According to some aspects described herein, the usage information may be further enhanced with information about the determined preferences of the user, and this may be used to inform recommendations for the user and other users with similar preferences. For example, the system may have determined that the user likely has small children in his family based on his past usage history and may annotate the channel change event described above with this information. The system may utilize data about usage events from the user and from other users determined to be similar to the user to provide well-tailored recommendations based on characteristics of the user. In some examples, the system may generate clusters of users and/or user-clusters based on common viewing behaviors and interests. Users may be assigned to one or more clusters (e.g. user-clusters) based on an analysis of their corresponding usage event data. For example, users who tend to watch reality TV may all be assigned to a "reality TV" cluster. Machine learning and/or semantic analysis techniques may be utilized to process data associated with users in the system and identify users having similar tastes, interests, habits, preferences, beliefs, and the like.

In some examples, batch processing may be utilized to organize users into clusters based on historical usage data. A given user may be placed in multiple clusters according to various user characteristics derived from his activity or known to the system from other sources. For example, a user who watches many sporting events but also watches Saturday morning cartoons may be grouped with users in a "sport fan" cluster and/or a "sports fan" cluster and also with users in a "family" cluster. The cluster assignment for a given user can also be made dependent on the day of the week and/or time of day to address the fact that different members of a household may use the same device at different times of the day. In some examples, a user may be assigned affinity weights to one or more clusters based on the degree to which the user's preferences match up with other users in the cluster. The recommendation system may monitor real-time usage data for a user and adjust the user's membership in a given cluster or an affinity weight for the cluster according to changes in the strength and/or nature of the determined preferences of the user. For example, if the user watches several soccer games in a short period, the affinity weight for the user relative to the "sport fan" cluster may be increased and/or the user may be added to an additional "soccer fan" cluster. As a result, the system may dynamically update models associated with the user and maintain a more accurate profile of the user's preferences and interests.

According to some aspects described herein, the recommendation system may monitor real-time usage information of the users in a cluster and use this information to generate recommendations for other users in the cluster. In some examples, the real-time usage information may include usage information of a current viewing session and may be processed during the current viewing session. The system may analyze usage information over a range of time relative to the current time in determining the existence of trends, in some examples. For example, the system may utilize a range of 10 minutes and consider recent usage information relating to programs watched and commands issued by users within the last 10 minutes. Any suitable criteria may be used in determining which usage events should be considered, such as events occurring within a recent time threshold on the order of milliseconds, seconds, minutes, hours, day, weeks, and the like. The system may determine one or more trends for various clusters in the system based on usage events associated with users in the clusters. In some examples, if a particular trend is identified in a cluster, such as a large number of reality TV fans tuning to a popular program, the system may decide to generate a recommendation for other users in the cluster. For example, other reality TV fans that have not yet switched to the popular program may receive a pop-up informing them of this trend and/or allowing them to tune to the popular program, for example with a single click. In some examples, the system may analyze additional information such as a rate of change of users initiating a particular event and/or command. For example, the system may recognize a trend and generate recommendations when a number of users switching to a channel over a given time period exceeds a threshold level. The system may utilize a combination of criteria to detect trends, such as detecting a trend when one or more of (1) ten percent of users in a cluster tune to a program during a showing or (2) one percent of users in the cluster tune to the program within a range of ten seconds, as but one example. In some examples, a user may request recommendations regarding popular and/or interesting content and the system may provide content recommendations based on what other similar users are currently viewing and/or have viewed.

As an example, if the system determines that a user who is identified as a "family" user tunes away from a news program when a car chase is displayed, this information may be used as a basis for recommendations to other users in the "family" cluster. Machine learning and/or semantic analysis techniques may be utilized to process data associated with users in the system and identify users having similar tastes, interests, habits, preferences, beliefs, and the like. The system may monitor real-time usage data for a user and adjust the user's membership in a given cluster or an affinity weight for the cluster according to changes in the strength and/or nature of the determined preferences of the user. According to some aspects described herein, the real-time usage data may be received and processed during a viewing session of the user, rather than merely stored and utilized for later batch processing. As a result, the system may dynamically update models associated with the user and maintain a more accurate profile of the user's preferences and interests.

In some examples, the system may provide recommendations to the user in the form of presenting the user with a list of content that is popular among similar users. Another form of recommendations may include adding, removing, and/or adjusting items from a list of content items displayed to the user. For example, when the user searches for a given term, standard results may be reorganized and enhanced based on the activity of similar users. Yet another form of recommendation may be adjusting visual, audio, and/or other aspects of the presentation of a media content item based on the trends, usage information, and/or preferences of the user and associated clusters. For example, the system may learn that many sport fans watching a game turn up the volume as one team approaches the goal. The system could then prompt other users watching the same game to turn up the volume and/or automatically turn up the volume for those other users. In still another form of recommendation, the system may select alternative content for inclusion in a presentation of a media content item. For example, system may select and/or suggest a PG-rated version of a movie if a user is assigned to a family cluster. As another example, if other users in the same cluster are rewinding a given scene in a program that the user is currently not watching, this may suggest that something interesting has happened in that other program.

Other aspects described herein may provide for the capture of real-time data with processing at a server or headend in the network. Usage information gathered from terminals having advanced capabilities may be used to inform recommendations made to users with basic terminals that are unable to track real-time usage data. Still other aspects may determine media context information using facial detection techniques, scene detection techniques, activity detection techniques, topic detection techniques (using spoken words, on-screen text, and/or closed captions, for example), music detection, and the like. One or more components of the system may process media content items to determine tags and other metadata for describing the media content and fragments thereof. Further, other aspects may dynamically determine when advertising content becomes stale with regard to certain users and may swap in new content based on the preferences and interests of a group of users.

Some aspects described herein may provide content and/or service providers with access to richer and more granular data to assess the popularity and effectiveness of programming. As described above, the system may combine usage events with user context information and media context information. Log entries including this information may be stored and/or organized in a database. The system may provide tools allowing access to and analysis of this data. Through review of the annotated log entries with context information, containing more than merely tune events and timestamps, content and service providers may more accurately assess the popularity of programming and may be enabled to drill-down and identify what aspects of a program appeal to users Various features of the methods and systems for recommendations and personalization based on real-time usage data discussed above will be further described below. However, first an exemplary operating environment as shown in FIGS. 1 and 2 will be described.

Figure 2:
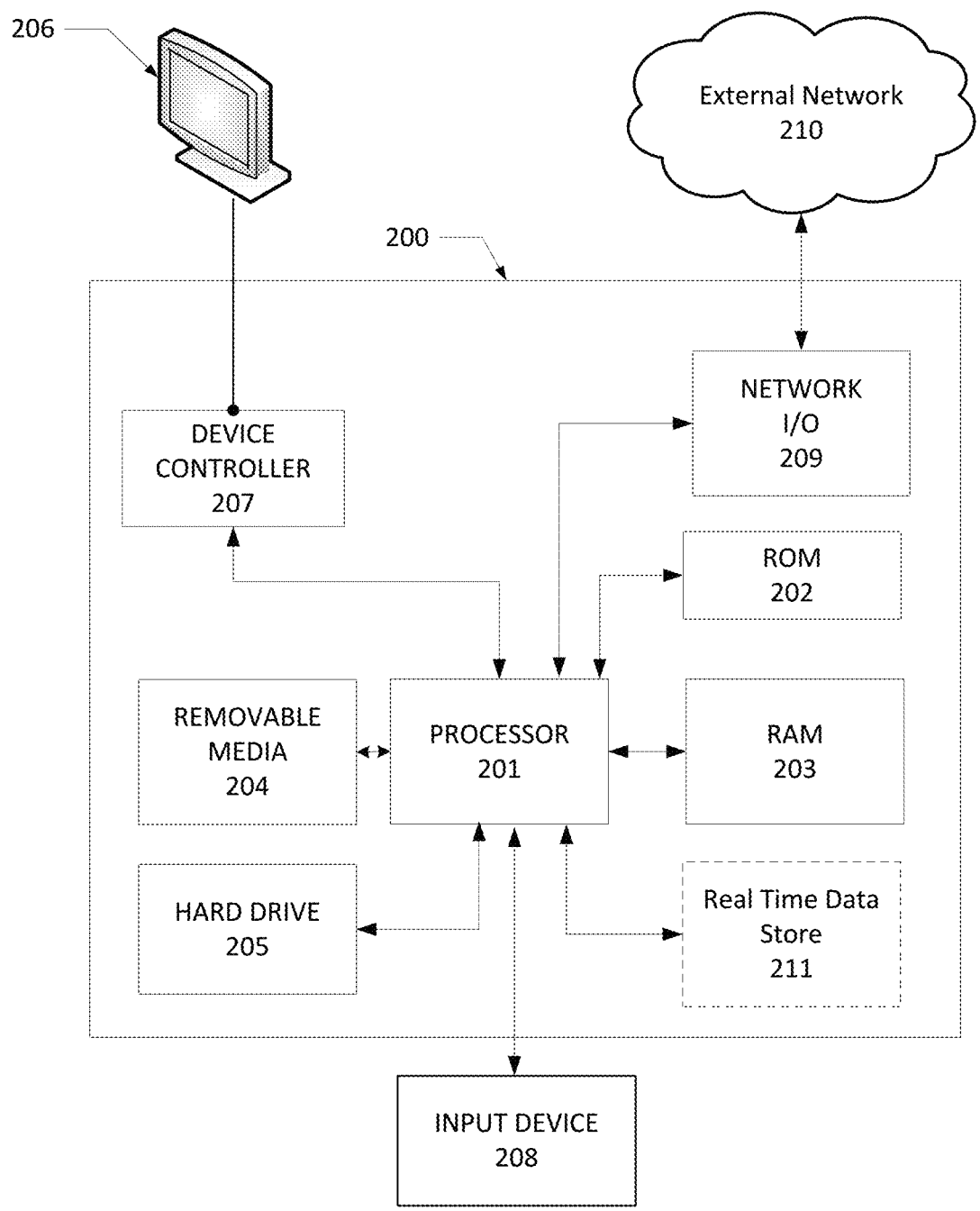
FIG. 2 shows an example computing device that can be used to implement any of the system, methods, servers, entities, and computing devices described herein.

FIG. 1 shows an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not shown, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Having described an example communication network shown in FIG. 1 in which various features described herein may be implemented, an example computing device as shown in FIG. 2 will be described.

FIG. 2 shows general hardware elements that can be used to implement any of the various systems or computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera input for user gestures, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some examples, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, in some examples the device may be configured to implement one or more aspects discussed herein. For example, the device may include a real-time data store 211, which may be configured to receive, store, and send information regarding events that take place at the device and/or in the network and associated context. The real-time data store 211 may utilize other components of the device, such as hard drive 205, removable media 204, and/or RAM 203.

The FIG. 2 example is a hardware configuration, although the shown components may be wholly or partially implemented as software as well. Modifications may be made to add, remove, combine, divide, etc. components of the computing device 200 as desired. Additionally, the components shown may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
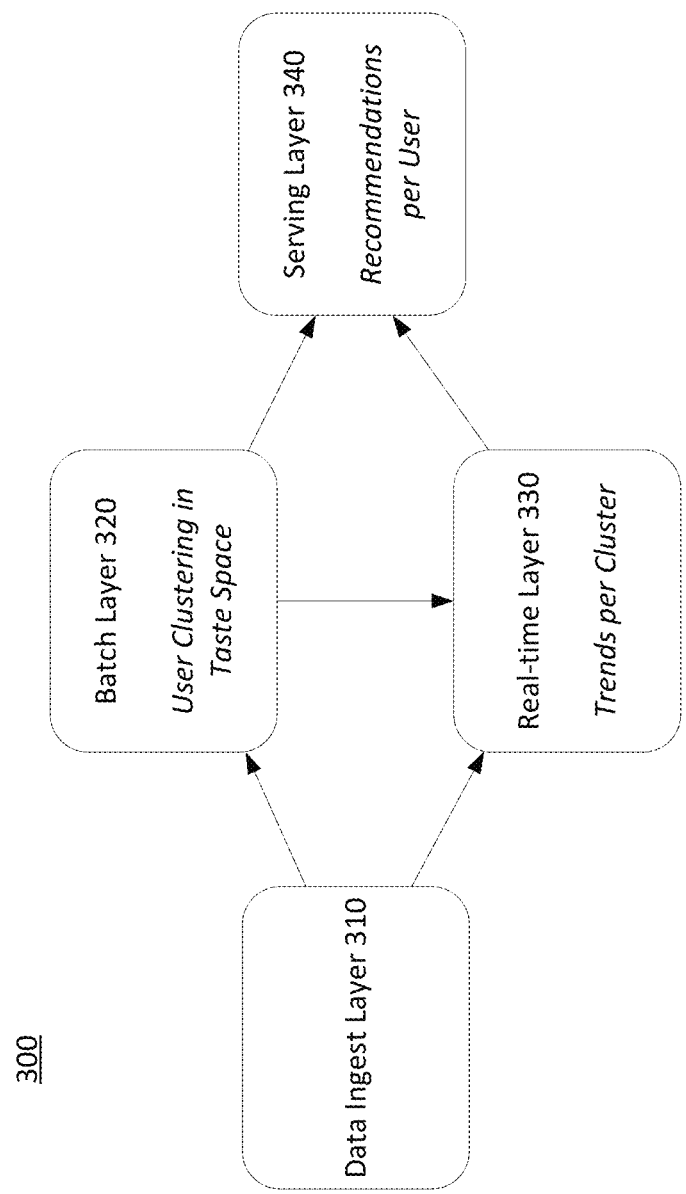
FIGS. 3A and 3B show example configurations for a system that may be used to implement one or more aspects discussed herein.
Figure 3B:
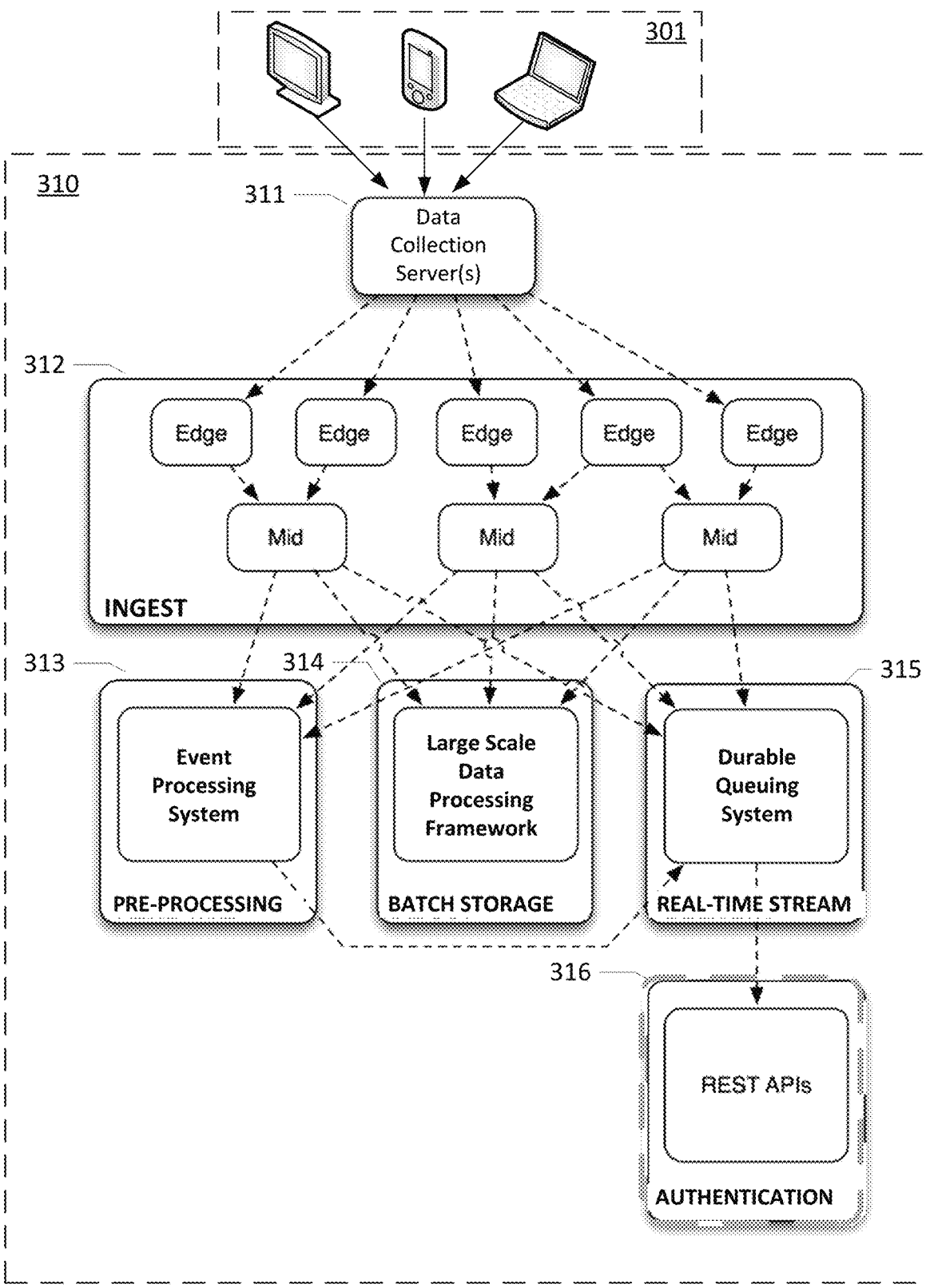

Having discussed example communication systems, networks and computing devices, discussion will now turn to an operating environment in which the various techniques described herein may be implemented, as shown in FIGS. 3A and 3B.

FIG. 3A shows an example configuration 300 which may be used in implementing one or more aspects described herein regarding recommendations and personalization based on real-time usage data. For example, configuration 300 may be implemented in a cable network such as that shown in FIG. 1 to provide improved recommendations regarding live, recorded, and on-demand content for users. The software architecture may include a data ingest layer 310, a batch layer 320, a real-time layer 330, and a serving layer 340. The layers and modules that make up the software architecture of configuration 300 may be implemented on one or more computing devices, such as computing device 200 as shown in FIG. 2. In some examples, the software architecture may be implemented in whole or in part by one or more servers associated with a service provider, such as servers located at headend 103 as shown in FIG. 1.

Data ingest layer 310 may be configured to retrieve, process, and/or store usage information generated by the activity of users in a network. One method by which the data ingest layer 310 may retrieve, process, and/or store usage information relating to users in the network will be discussed further below in regard to FIG. 5. Usage information may include control commands and/or other interactions between the users and their respective devices in the consumption of media content. In some examples, the data ingest layer 310 may receive information regarding remote control commands issued by the user to his set-top box when viewing media content on the cable network. The control commands and/or other interactions may be received by the data ingest layer 310 as event information and may include events such as: channel up, channel down, volume up, volume down, mute, last channel, opening a guide, opening program information, rewind, fast forward, replay, jump ahead, pause, stop, play, power off, power on, picture-in-picture, input switch, numerical and/or text input, menu navigation and/or any other suitable commands. Event information may include additional details regarding the context of the event, such as: initial channel, final channel, time, sequence of actions, prior volume, final volume, beginning time stamp, ending time stamp, playback position, duration of pause, time since last change, time and/or date of event, and any other suitable information regarding the context of the event. Usage information may also include data indicating that the user watched a certain program, how long the user watched the program, when the user watched the program, how the user arrived at the program, and any other suitable information. Usage information may also include data indicating how event information or usage information was selected, e.g. origin data from a menu, graphic user interface, and/or other interface controller. For example, the usage information may comprise the type, position, and or location data for a selected GUI element, which may have initiated a control command.

Usage information may be captured by the data ingest layer 310 and/or other system component based on any suitable cues and/or factors associated with the different types of usage information. For example, when determining how long the user watched the program, the computing device may use cues and/or factors associated with display of the program to determine when the user may have stopped viewing the program. The cues associated with display of the program may include, for example, determining whether a user powers off the viewing device but not the set top box and/or DVR, or if the user selects a different program for display. Other cues may include signals from motion sensors. Motion sensors of a user premises may transmit a signal indicating that a user has departed room A (with the display of the program) and moved to a different room B. If there is also no further motion in room A, then this may be an indication that the user has stopped viewing the program. Other cues may include a signal from a home security system indicating that the security system has been armed and/or no users remain in the premises. Additional cues may comprise signals from an accelerometer configured to detect vibrations in the vicinity of a display of the program. For example, an accelerometer may be preset to send a signal that the user has stopped viewing a program if no vibrations above and/or satisfying a vibration threshold have been registered within a predetermined time period. Further cues may include pressure sensors in seats, sofas, and/or chairs of room A, and/or audio sensors in room A. For example, if the pressure sensors and audio sensors of room A indicate that the seats are empty and the room is substantially silent (e.g. decibel levels are below an audio threshold value), then this may indicate that the user has stopped viewing the program. The audio sensor system of this example may be configured to filter out, remove, and/or suppress any audio projected from the program (or from a stereo system associated with any display device of the program) using spectral analysis techniques, such as Fourier transform or Fast Fourier transform analysis.

Another cue that may be used to determine when a user has stopped watching a program may include video streaming to a second display device operating on a shared network, e.g. a network shared with the display of the program. For example, if a user is viewing the display of the program, but then begins streaming a video on their smartphone, then this may be an indication that the user has stopped viewing the program. This example may apply to any application being run on any device. In addition, the system may also incorporate positioning data from the second device, such as GPS positioning information, to determine whether the user is in room A. For example, the system may determine that a user has stopped viewing a program if the second device is both in room A and is streaming a video and/or running an interactive application. Further, these conditions may be subject to time thresholds. For example, the system may determine that a user has stopped viewing a program if the second device is in room A and has been streaming a video and/or running an interactive application for at least 30 seconds.

The usage information associated with the control commands and other interactions may be combined with user context information and/or media context information. The data ingest layer 310 may determine and/or receive information regarding a user context associated with the event. For example, the user context information may indicate that the user is a male in his mid-30s that likely has two small children and enjoys watching sports. User context information may be determined based on past usage history of the user as described further herein and/or may be retrieved from other sources, such as a billing system or customer database. User context information may include, for example: age, gender, location, subscription level, related users, categories associated with the user, clusters associated with the user, user preferences and interests, and/or any suitable demographic information or information regarding the user's tastes and characteristics. The data ingest layer 310 may receive part of the user context information from the user device, third-party sources, a database maintained within the network, and/or any suitable source. Additionally and/or alternatively, the data ingest layer 310 may determine preferences and interests of the user based on the event and past events associated with the user.

The data ingest layer 310 may also determine and/or receive information regarding a media context associated with the event. For example, the media context information may indicate that the channel change event occurred 4 minutes, 33 seconds, 130 milliseconds into a news program while a car chase was being displayed. In some examples, the media context information is based on tags associated with the media content. The media content may be broken up into granular fragments such that the event may be associated with the content of the program at the time of the event. For example, a program could be broken into 2-second segments and each could be tagged with various metadata regarding the content of the segment. As another example, a program could be divided into each individual frame and they could be similarly tagged. The media context information may include metadata and/or tags associated with a fragment of the media content item, for example relating to actors, anchors, topics, content rating, type of scene, objects in the scene, violence, bad language, adult content, genres, and/or any other information about the content of the media item during that fragment. Examples of the data structures associated with content fragments and usage information will be discussed further herein with reference to FIGS. 6A and 6B.

The media context information may be pre-determined by a content analysis server within the network using facial detection techniques, scene and/or object detection techniques, activity detection techniques, topic detection techniques, and/or any other suitable techniques for assessing the nature of a portion of audiovisual content. The content analysis may be performed as part of data ingest lawyer 310, or may be performed by a separate part of the system. The media context information may include information from a third-party metadata source such as a program information database and/or an application programming interface associated with a program information database. The data ingest layer 310 may combine the event information, the user context information, and the media context information to generate detailed usage information for use by batch layer 320, real-time layer 330, and serving layer 340. In some examples, the usage information generated by the data ingest layer 310 may be stored for future batch processing by the batch layer 320 and streamed to real-time layer 330 for processing within a current session to provide results substantially on-the fly. For example, by streaming usage information to real-time layer 330, the system may be able to provide recommendations based on the user and/or other user's immediate usage history, such as within the last 2-10 seconds.

Batch layer 320 may utilize the historical usage information collected by data ingest layer 310 to generate user clusters based on determining similar tastes and/or preferences reflected in the usage information. One method that may be used by the batch layer 320 to generate clusters will be discussed further herein in regard to FIG. 7A. The batch layer 320 may use machine-learning and/or other forms of semantic analysis to assess historical usage information for users in the network in order to identify common interests, preferences, and/or characteristics of users in the network. These common characteristics may be used to generate clusters of users based on similarities determined from the usage information. For example, the batch layer 320 may receive usage information for a large number of users and may group a subset of those users together based on the frequency with which some of the users watch sports. The batch layer 320 may store a mapping associating the users to the identified clusters for use by the data ingest layer 310, batch layer 320, real-time layer 330, and serving layer 340. Additionally and/or alternatively, the batch layer 320 may generate or receive a user profile comprising attributes, characteristics, preferences, and/or interests of the user based on an analysis of the usage information.

A given user may be placed in multiple clusters according to various user characteristics derived from his activity or known to the system from other sources. For example, a user who watches many sporting events but also watches Saturday morning cartoons may be grouped with users in a "sports fan" cluster and/or also with users in a "family" cluster. In some examples, a user may be assigned affinity weights to one or more clusters based on the degree to which the user's preferences match up with other users in the cluster. As another example, a user may be placed in a cluster based on demographic information, such as a cluster of users based on living in a common geographic and/or metropolitan area.

Real-time layer 330 may receive real-time usage information as it is processed by data ingest layer 310 and use it to update the clusters of users and/or generate recommendations based on activity within the clusters. In some examples, real-time layer 330 may use the real-time usage information to assess changes in user preferences and interests and/or dynamically adjust the clusters generated by the batch layer 320. The real-time layer 330 may monitor real-time usage data, such as usage data associated with a current viewing session, for a user and adjust the user's membership in a given cluster or an affinity weight for the cluster according to changes in the strength and/or nature of the determined preferences of the user. For example, if the user watches several soccer games in a short period, the affinity weight for the user relative to the "sport fan" cluster may be increased and/or the user may be added to an additional "soccer fan" cluster. As a result, the system may dynamically update models associated with the user and maintain a more accurate profile of the user's preferences and interests.

The real-time layer 330 may also monitor real-time usage information of the users in a cluster and use this information to generate recommendations for other users in the cluster. The system may determine one or more trends for various clusters in the system based on usage events associated with users in the clusters. These trends may be used to generate recommendations for users in serving layer 340. The real-time layer 330 may implement machine-learning and/or other semantic analysis techniques to determine trending actions within a given cluster of users. In some examples, the real-time layer 330 may analyze the programs being viewed by users in each cluster and their relative popularity within each respective cluster. For example, the real-time layer 330 may determine that users in the "reality TV" cluster are currently watching "Real Pets of Orange County" and "The Voice," while users in the "sports fan" cluster are currently watching "Sports Night" and "Legends." The real-time layer 330 may determine a list of top programs and/or associated commercial advertisements for the various clusters and may make this information available to the serving layer 340 for the generation of recommendations. This technique enables real-time layer 330 to generate personalized and/or targeted recommendations for programming and/or advertisements.

In other examples, the real-time layer 330 may analyze the events generated by users in a cluster to determine the existence of a control trend within the cluster. For example, the real-time layer 330 may determine that a threshold number of users have turned the volume up during a particular portion of a media content item. As another example, the real-time layer 330 may determine that a threshold number of users are rewinding a particular portion of a media content to watch it again. This could indicate, for example, that the portion of the media content item is more exciting or desirable for users in that cluster. Control trends may include, for example, volume up, volume down, mute, channel change, and/or rewind commands. As one example, the real-time layer 330 may detect that a large number of users in the "sport fan" cluster turn the volume up at a certain point in a football game, such as when one team approaches the end zone. The real-time layer 330 may determine that this represents a control trend corresponding to the media content item among users in the cluster and may make this information available to serving layer 340 for use in generating recommendations for users in the cluster.

In still other examples, the real-time layer 330 may analyze the events generated by users in a cluster to identify an emerging trend within the cluster. For example, the real-time layer 330 may detect a spike in the number of users in a cluster that tune to a particular channel. This may indicate, for example, that something exciting to those users is taking place on that channel. The real-time layer 330 may use any suitable criteria to determine if an emerging trend is occurring within the cluster, such as by detecting a threshold number of similar events within a fixed time period and/or by determining that a rate of change of the number of users in the cluster tuning to that channel exceeds a threshold level.

The serving layer 340 may utilize the trend information generated by the real-time layer 330 and the cluster information generated by the batch layer 320 to generate recommendations and personalizations for a user. When the user takes an action that requests recommendations, such as by selecting to view a list of popular programs, the serving layer 340 may determine recommendations for the user based on trends within one or more clusters associated with the user. Another form of recommendations may include adding, removing, and/or adjusting items from a list of content items displayed to the user. For example, when the user searches for a given term, standard results may be reorganized and enhanced based on the activity of similar users. The user may take other actions that do not expressly request recommendations, such as performing a search, and still be provided with recommendations. For example, when a user searches for a term, the user may be presented with results based at least in part on popular programs within one or more clusters associated with the user.

Figure 10A:
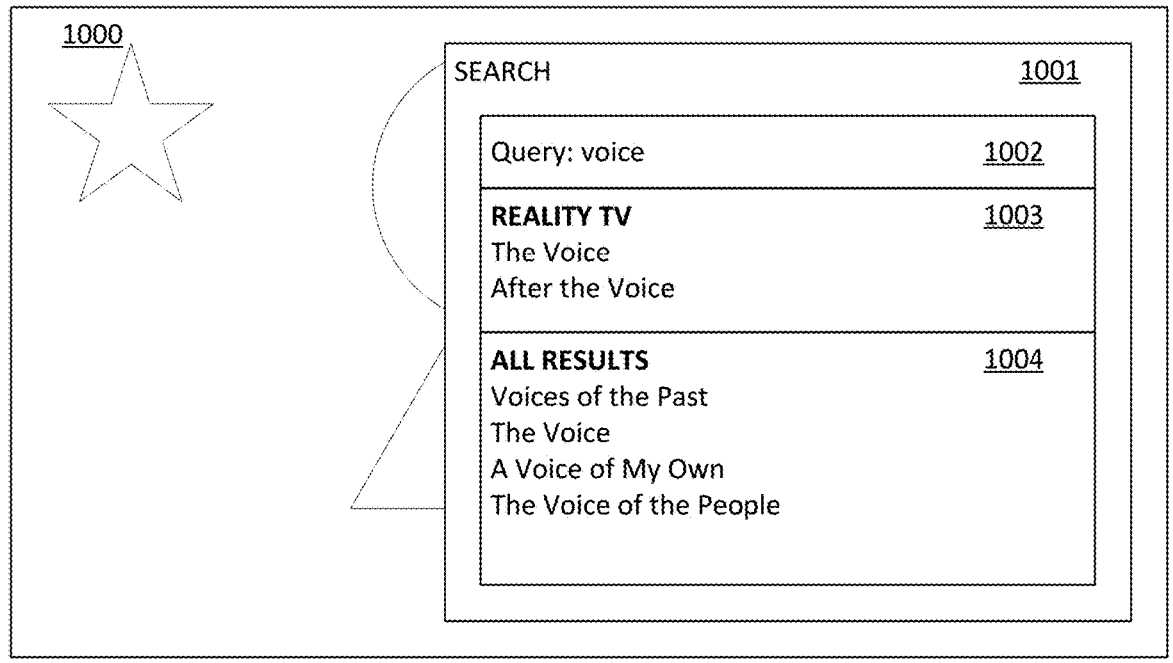
FIGS. 10A, 10B, 10C, and 10D show example user interfaces that may be provided according to one or more aspects discussed herein.

One example of this is shown in FIG. 10A. FIG. 10A shows an example interface 1000 that may be provided to a user when the user initiates a search request 1001 using a query 1002. Information about the preferences and/or interests of the user, including what clusters the system associates with the user, may be used to return tailored results. In the example shown in FIG. 10A, the search results may be categorized and grouped based on an associated cluster, such as in reality TV result group 1003 and all results group 1004. However, in other examples the results may be combined and prioritized and/or organized based on a similarity to the user.

Figure 10B:
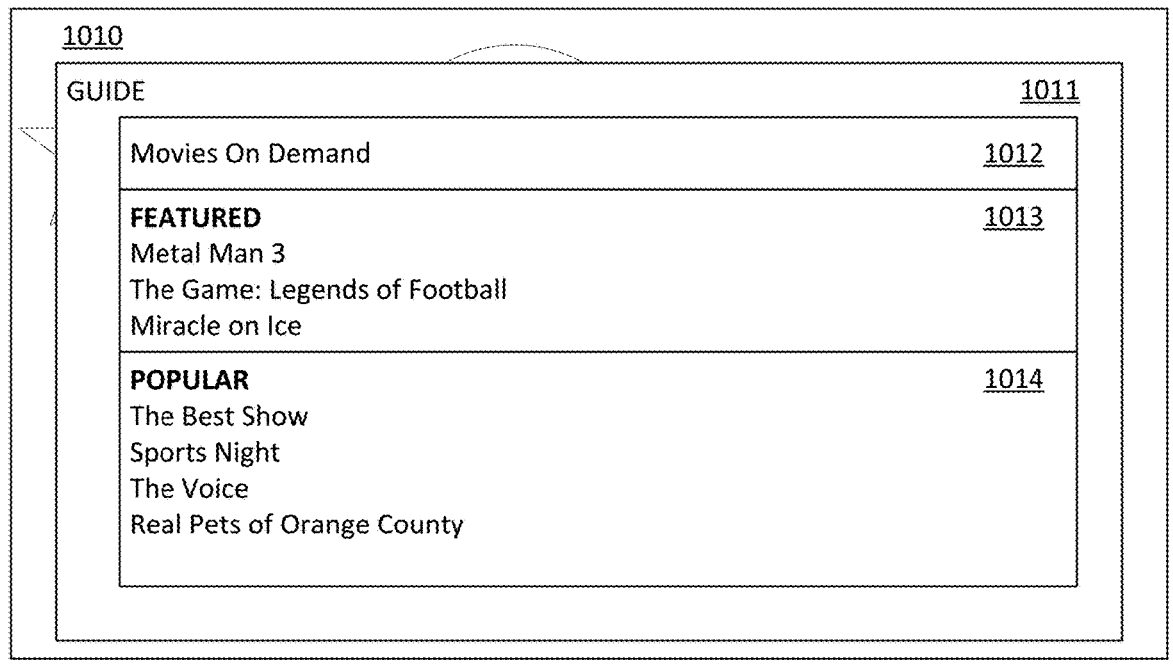

Another example of this is shown in FIG. 10B. FIG. 10B shows an example interface 1010 that may be provided to a user when the user opens a program guide to a video on demand page 1012. The video on demand page 1012 may contain media content items organized into categories and lists such as featured list 1013 and popular list 1014. These lists may contain initial results based on the broader trends within the content network. However, if the system has determined that the user has certain preferences and/or interests, or is a member of a cluster, the system may adjust the results to include tailored results selected based on the user attributes. For example, popular results for a sport fan user may include "The Best Show" which is recommended generally, but may also include "Sports Night" even if it is not popular with the broader viewing public.

Returning to FIG. 3A, in response to a user request for recommendations, the serving layer 340 may look up one or more clusters associated with the user based on data generated by the batch layer 320. The serving layer 340 may assess whether any trends or popular programs are associated with the one or more clusters based on data generated by the real-time layer 330. The serving layer 340 may generate a recommendation for the user based on the trends and/or popular programs associated with the clusters. The serving layer 340 may utilize any appropriate criteria in selecting trends and/or popular programs for use in generating the recommendation. For example, the serving layer 340 may assess an affinity weight to determine how to weight trends and programs associated with each cluster, such that trends associated with clusters more closely matched to the user's preferences and interests are more likely to be featured then trends associated with other clusters. As another example, the serving layer 340 may utilize other factors in determining which cluster's associated trends and/or popular programs to use in a recommendation, such as a current time of day, day of the week, identified user, currently watched program, recently watched programs, and/or any other suitable criteria. In addition, serving layer 340 may generate recommendations for targeted and/or specialized commercial breaks based on commercial advertisements that may be associated with the trends, popular programs, and/or the other factors, e.g. current time of day.

The serving layer 340 may also determine that an emerging trend is associated with one or more clusters as determined by the real-time layer 330 and may generate recommendations based on the emerging trend. For example, if the emerging trend is that sport fans are tuning to a football game as overtime starts, serving layer 340 may look up users that are in the sport fan cluster and recommend that they tune to the game. In some examples, the serving layer 340 may generate a notification regarding the recommendation that the user tunes to the game and may cause the notification to be displayed on the user's screen. The notification may be operable by the user to tune his set-top box to the game to catch the exciting moments. In other examples, the serving layer 340 may automatically implement the recommendation by tuning the user to game. The system may determine to automatically implement a recommendation where the strength of the recommendation is very strong, such as where a higher threshold number of users have tuned to the game. Additionally and/or alternatively, the user may opt-in/opt-out of automatic implementation of suggestions through a user preference or setting. In some examples, an indication may be displayed informing the user that an automatic recommendation has been implemented.

Figure 10C:
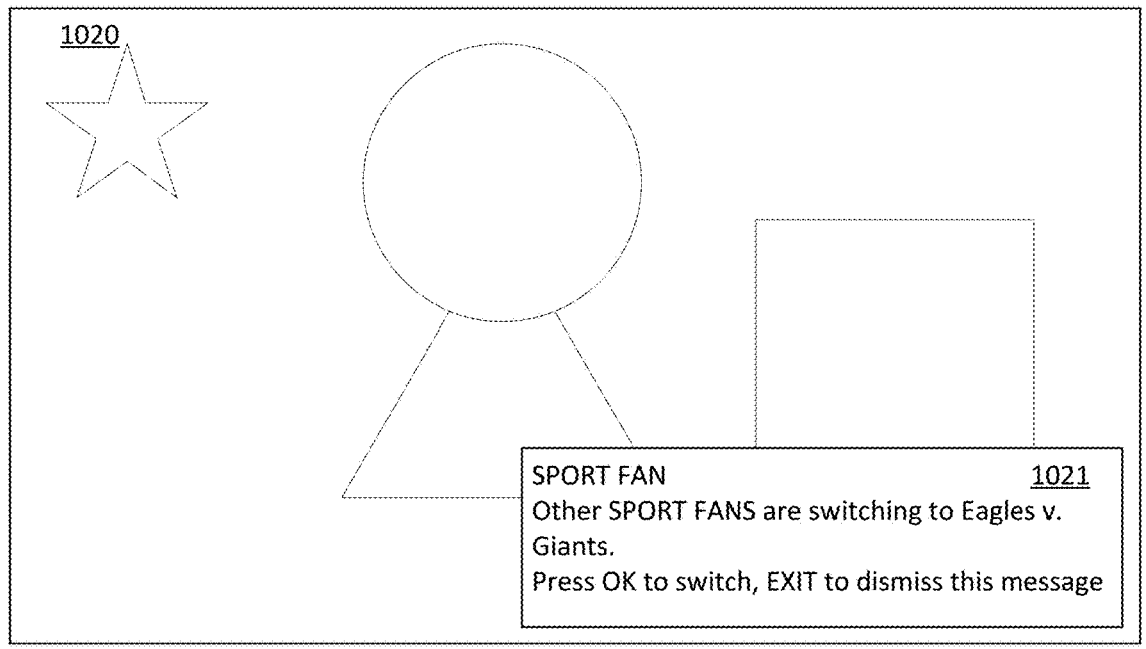

One example of this is shown in FIG. 10C. FIG. 10C shows an example interface 1020 that may be provided to a user who is determined to be a sport fan. If the real-time layer 330 detects an emerging trend among sport fans, such as where other sport fans are switching to the Eagles v. Giants football game, the system may generate a notification 1021 prompting the user to change channels.

Returning to FIG. 3A, the serving layer 340 may further determine that a control trend within a cluster associated with the user relates to a media content item being viewed by the user. In response to detecting a control trend associated with a media content item being viewed by the user, the serving layer 340 may provide a recommendation for adjusting visual, audio, and/or other aspects of the presentation of a media content item based on the trends, usage information, and/or preferences of the user and associated clusters. For example, the system may learn that many sport fans watching a game turn up the volume as one team approaches the goal. The system could then prompt other users watching the same game to turn up the volume and/or automatically turn up the volume for those other users. As another example, the serving layer 340 may determine that the user is watching a recorded movie. The serving layer 340 may further determine that the user belongs to the "family" cluster and that other users in the family cluster used a fast forward command to skip a violent scene during the movie based on usage information corresponding to the other users. As playback of the recorded movie approaches the violent scene, the serving layer 340 may generate a recommendation that the user skip the scene and cause a notification to be displayed to the user regarding this recommendation. The notification may allow the user to select an option to implement the recommendation, an option to ignore the recommendation, and an option to disable future recommendations, for example. In some examples, the serving layer 340 may determine that the recommendation should be automatically implemented based on the strength of the recommendation and/or the user's expressed preferences, as discussed above.

The serving layer 340 may use any suitable methods to determine whether a control trend is emerging and/or has emerged within a particular cluster. For example, the serving layer 340 may first determine and/or set a control trend threshold which may represent a threshold number of users and/or a threshold percentage of users that perform a specific control command associated with a specific media content item and/or a specific type of media content item. Additionally and/or alternatively, the control trend threshold may comprise a rate of change of a number of users in a cluster that initiate a particular control command while viewing the media content item. The server layer may determine and/or set the control trend threshold automatically in some examples, or may set the control trend threshold responsive to a request by a service provider, administrator, and/or user in other examples.

As one example, the control trend threshold value may be set such that a rewind control trend is recognized when 25 percent of a sports cluster's members rewind a specific sports program at a particular point in the sports program. In some examples, the system may selectively include, measure, and/or account for only those cluster members that are currently viewing the specific sports program and/or media content item (or exclude and/or omit customers that are not viewing the specific program). In this example, the threshold percentage of users may be set to 25 percent of a cluster's members who are actually watching the media content. The threshold may be further enhanced by including and/or setting an offset and/or deviation range for any particular point or range in the content item from which any control trends are based and/or measured. For example, the deviation range may be set to 40 seconds from the beginning of a frame and/or scene. In this example, any member who selects rewind within 40 seconds of the beginning of a frame and/or scene may be included in the control trend threshold. Then, the serving layer 340 may make a recommendation that a control command begin at the start of that frame and/or scene if the control trend threshold is ultimately satisfied. In some examples, the deviation range may be set in relation to other members (e.g. other members of the particular cluster) instead of the beginning of a frame and/or scene. Continuing the example, a deviation range may be set at 30 seconds relative to other members of the cluster who are using (e.g. viewing) the media content item. Thus, in the example, only members who are using the same media content item and who rewind within 30 seconds of each other will be included in determining whether the example control trend threshold has been met, exceeded, and/or satisfied.

In one example, the serving layer 340 may determine and/or calculate a command starting point and/or stopping point for each member. Based on this information, the serving layer 340 may determine a mean and/or average control command starting and/or stopping point for members of the cluster. Then, the serving layer 340 may make and/or transmit a recommendation for a user to begin a control command (e.g. rewind, pause, fast forward, skip, etc.) at the mean and/or average starting point. In stopping the function, the serving layer 340 may simply stop the function (e.g. rewind, pause, fast forward, skip, etc.) automatically based on the average stopping point for the members. In other examples, the serving layer 340 may slow the rate of the function (e.g. slow down the rate of a fast forward or rewind function) and then inquire if the user would like to resume normal use of the media content item. In some implementations, the serving layer 340 may determine the frame and/or scene that starts closest to the mean and/or average starting point for the members. This may form the basis for serving layer 340's recommendation. The averaging method described above may be used to determine potential control command points in a media content item, such as how far back to rewind a media content, how far ahead to skip a scene, and/or how far to raise and/or lower a volume. In addition, the features and techniques addressed herein may be used for control trends that have emerged in a particular cluster for commercial advertisements, thus enhancing the personalization of recommendations for commercial advertisements.

As another example, according to some techniques described herein, the serving layer 340 may determine that any skip and/or fast forward command in a family programming cluster will be assigned a control trend threshold of 18 percent with a deviation threshold of 20 seconds. If 23 percent of the cluster's members (who are watching a particular program) choose to skip and/or fast forward within 20 seconds of each other, then the serving layer 340 may determine that the control trend threshold has been satisfied. Then, the serving layer 340 may determine the stopping point for each of the members of the cluster who selected to skip and/or fast forward. The serving layer 340 may estimate the average stopping point of the members in order to determine the recommended stopping point for a user. Then, at a recommended control command point (determined according to one or more techniques described herein), the serving layer 340 may recommend that a user skip and/or fast forward the programming. Subsequently, the serving layer 340 may automatically stop the skip and/or fast forwarding at the recommended stopping point, or a recommendation may be sent to the user to end the skip and/or fast forwarding. In an alternate example, the serving layer 340 may automatically perform all of the recommended control functions. For example, the serving layer 340 may automatically skip and/or fast forward at the recommended control point and then automatically end the function at the recommended stopping point. It is noted that specific values used herein (such as 25 percent, and 40 seconds) are used for illustration purposes and are not meant to be limiting.

Control trends (such as a threshold number of cluster members are switching or have switched to this program) and/or control command points (such as the starting and stopping points) determined according to aspects described herein may be used to augment metadata of respective content items associated with the control trends and/or control command points. This augmented metadata may be used to create and/or generate a trending live programming guide, which may be displayed to users. The guide may display a menu (similar to an Electronic Program Guide (EPG)) wherein currently trending media content, as determined by the amount of control command activity for the cluster, are listed and/or displayed. The listing may also display real time trend metadata to show the type and/or quantity of control commands that are being performed for each media content item. The content items may be displayed according to scheduled programming times and/or according to the amount of control command activity. For example, a football game may be listed first along with a caption which expresses that 35 percent of sports cluster members have tuned into this program within the last 2 minutes. The listing may also include a recommendation for the user to select this program. The trending live programming guide may incorporate all types of programming, including trends associated with digital video recordings (DVR) and video on demand (VOD).

In still another form of recommendation, the serving layer 340 may select alternative content for inclusion in a presentation of a media content item based on activity of other similar users in a cluster associated with the user. For example, the system may select and/or suggest a PG-rated version of a movie if a user is assigned to a family cluster. The determination to show alternative content may also be based on automatic analysis of the content that is then combined with the user activity to identify what constitutes offending content for a given cluster and to learn when to show alternative and/or modified content automatically. As another example, the system may replace commercial advertisements with targeted advertisements for a cluster for a cluster, e.g. age appropriate advertisements for a family cluster. In the family cluster example, a determination may be made to exclude commercial advertisements considered to be inappropriate for the family cluster. This determination may be made based on a preset association of advertisements with primary programming. For example, R-rated programming may be associated with commercials for other R-rated programming. Thus, if a recommendation is made to replace the R-rated programming with a PG version, then the same may occur with any associated commercial advertisements in the cluster that contain metadata revealing restricted material.

Figure 10D:
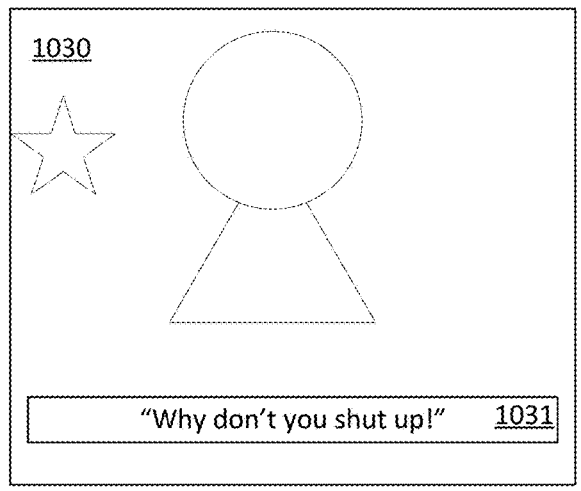
Figure 10E:
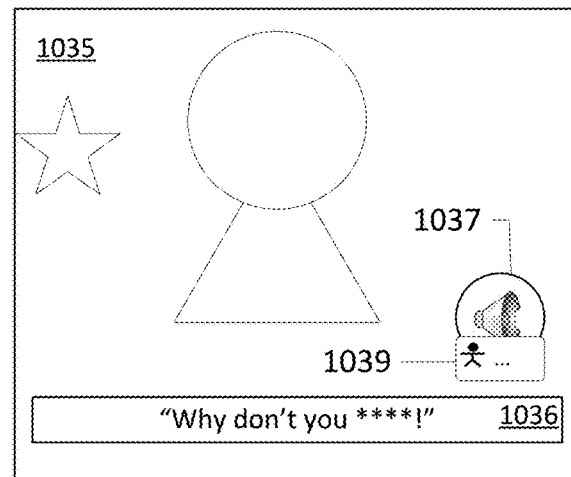

One example of this is shown in FIGS. 10D and 10E. FIG. 10D shows an example scene 1030 of a content item that may include adult content 1031. The system may detect, for example, that users in the family cluster tend to mute the content item during the adult content. If the system detects a threshold number of users in the family cluster mute that fragment of the content item, the system may generate a recommendation that other similarly situated users, such as other users in the family cluster, mute the fragment. This is shown in FIG. 10E, where an adjusted version 1035 of the content item is presented including modified content 1036. The display may also include an indicator 1037 showing that a recommendation action has been automatically applied and a cluster indicator 1039 showing why the system applied this recommendation for this user. In other examples, the system may select an alternative version of the content item rather than adjust audio. Further, in the case of DVR and/or VOD content, the recommendation information may be stored in association with the DVR and/or VOD content for later retrieval.

FIG. 3B shows an example implementation of ingest layer 310. In FIG. 3B, data collection servers 311, ingest module 312, batch storage module 314, pre-processing module 313, real-time stream module 315, and authentication module 316 may correspond to data ingest layer 310 of FIG. 3A. Batch storage module 314 may correspond to one or more data sources for the batch layer 320. Real-time stream module 315 and/or authentication module 316 may correspond to data sources for the real-time layer 330 of FIG. 3A. In one example, authentication module 316 may add the ability to control access to the data via a Representational State Transfer (REST) API to create a scalable web service to provide the data.

As shown in FIG. 3B, one or more user devices 301 may be connected to backend data collection servers 311 and may provide usage information to the data collection servers 311. Backend data collection servers 311 may be implemented using a cross-functional runtime environment that facilitates communication between user devices such as set-top boxes and servers in the network. Data collection servers 311 may be implemented using servers located at a headend in a cable network and/or may be remote from user devices 301 in a data center. Usage information from the data collection servers 311 may be provided to ingest module 312, where the usage information may be further processed and aggregated for further use by batch storage module 314, pre-processing module 313, and/or real-time stream module 315. In one example, the ingest module 312 may be implemented using the Flume service provided by Apache. In the figure, for example, the "Edge" servers may refer to the servers that directly communicate with the backend data collection servers 311 and receive data from them. The input into the edge servers may then be routed and aggregated in "Mid" servers that clean up and process the raw logs to make them more suitable for further processing and/or augment them with extra information.

Data processed and/or aggregated by the ingest module 312 may be stored by batch storage module 314 and then processed by software in batch layer 320 (of FIG. 3A) to generate clusters associated with users in the network based on similarities included in the usage information. As described above, batch processing may utilize machine-learning and/or other semantic analysis techniques to generate clusters of users. In one example, the software in batch layer 320 may be implemented using a large-scale data processing framework. In one example, the Hadoop or Spark large-scale data processing framework may be used. A distributed Hadoop file system may be utilized as part of batch storage module 314 to facilitate computation and storage of the user profiles and clusters.

The pre-processing module 313 may process data generated by the backend data collection servers 311 and/or collected by the ingest module 312 to pre-process the usage data. Pre-processing may be utilized to extract trend information from the usage data and/or to analyze complex events, such as multichannel tunes. Pre-processing may use one or more distributed event processing systems to extract the trend information and/or analyze complex events. In one example, the pre-processing module 313 may be implemented using the Apache Storm event processing framework initially developed by Twitter. Pre-processed usage data may be provided to the real-time stream module 316.

The real-time stream module 315 may provide the real-time layer 330 of FIG. 3A with access to real-time usage information generated by the ingest module 312 and/or pre-processing module 313. In some examples, the real-time stream module 315 may comprise a durable event queue allowing multiple systems, such as the real-time layer 330 and/or other systems in the network, access to the event data in real-time for processing. In one example, the real-time stream module 315 may be implemented using the Kafka message queuing system provided by Linkedin or Kinesis as may be provided by Amazon Web Services.

The authentication module 316 may comprise one or more application programming interfaces (APIs) that allow access to the data provided by the real-time stream module 315, in some examples. The authentication module 316 may add an additional layer of access control to the delivery of event data to protect the usage information from unauthorized access. In some examples, the authentication module 316 may be omitted and the real-time layer 330 and/or other components of the recommendation system may access the usage information through the real-time stream module 315. In one example, the authentication module 343 may be implemented using one or more REST APIs (Representational State Transfer Application Programming Interfaces).

The data provided by real-time stream module 315 and/or authentication module 316 may be used by the real-time layer 330 to determine trends associated with the clusters determined by the batch layer 320 based on event information contained in the data. As described previously, the real-time processing may determine control trends, popular programs, emerging trends, and/or other trends included in the usage information collected by the data ingest layer. In some examples, the real-time layer 330 may also use the event information to adjust the relationship of a user to the clusters determined by the batch layer 320 according to changes in preferences of the user. The presentation layer 340 may utilize the trend information detected by the real-time layer 330 and the cluster information generated by the batch layer 320 to determine whether to provide recommendations to user in the network, according to some aspects described herein.

Although the various modules shown in FIG. 3B are shown as separate modules, it should be understood that the modules may be combined in any suitable manner and the functions described for one module may be handled by another module without departing from the features described herein.

Figure 4:
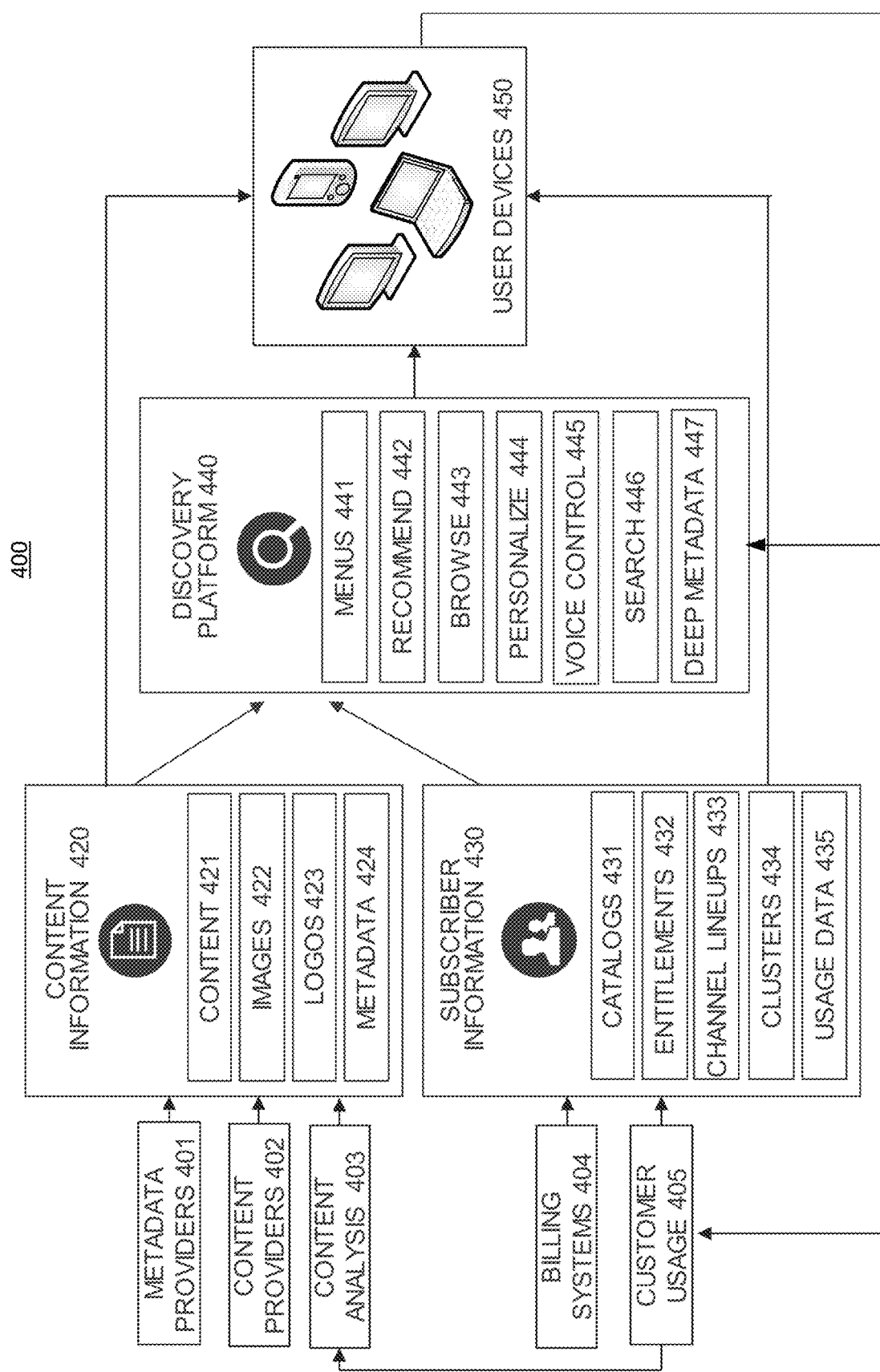
FIG. 4 shows an example of data services and information transfer between devices in a system according to one or more aspects discussed herein.

Having discussed an example configuration for a recommendation system as shown in FIGS. 3A and 3B, discussion will now turn to FIG. 4 which shows data sources and information transfer between devices according to some aspects described herein.

FIG. 4 shows a recommendation system 400 having various data sources and processing platforms, and the information transfer between the entities. The recommendation system 400 may be implemented using one or more computing devices, such as computing device 200. In some examples, portions of recommendation system 400 may be implemented on one or more servers in a cable network, such as servers located at headed 103. Recommendation system 400 may include subscriber information platform 430, content information platform 420, and discovery platform 440. The discovery platform 440 may perform a similar function to those described with respect to one or more layers of FIG. 3A, such as the batch processing layer 320, the real-time layer 330, and/or the serving layer 340.

The subscriber information platform 430 may provide event information and/or user context information to discovery platform 440. Customer usage data source 405 may provide event information about a user's interactions with a user device of user devices 450. The subscriber information platform 430 may store customer usage data 435 and/or provide the usage data to discovery platform 440. Event information generated by the activity of a user and stored by the subscriber information platform may include control commands and other interactions between the user and his respective devices in the consumption of media content. In some examples, the subscriber information platform 430 may receive information regarding remote control commands issued by the user to his set-top box when viewing media content on the cable network. In some examples, the discovery platform 440 may receive some or all of the event information directly from user devices 450.

The subscriber information platform 430 also stores user context information such as available catalogs 431 in the network, user entitlements 432, channel lineups 433, and clusters 434 associated with the user. Information about available catalogs, entitlements, and lineups may be retrieved from billing systems 404, in some examples. Clusters 434 may be generated by subscriber information platform 430 based on the usage data 435 and/or other attributes of the user. Alternatively and/or additionally, the clusters 434 may be generated by the discovery platform 440 and may be transmitted to subscriber information platform 430 for storage and/or further processing. In some examples, the subscriber information platform 430 may maintain a list of clusters associated with a given user while the discovery platform 440 may maintain a list of users associated with each cluster.

User context information may be determined based on past usage history of the user as described further herein and/or may be retrieved from other sources, such as billing system 404 and/or any suitable data source having information regarding characteristics, preferences, interests, and the like associated with the user and/or his usage. The subscriber information platform 430 may receive part of the user context information from the user device, third-party sources, a database maintained within the network, and/or any suitable source. Additionally and/or alternatively, the subscriber information platform 430 may determine preferences and interests of the user based on the event and past events associated with the user.

The content information platform 420 may provide media context information for use in logging and/or analyzing event information received by the subscribed information platform 430 and/or the discovery platform 440. The content information platform may receive media context information from various data sources. These data sources may include metadata data sources such as metadata providers

401, content data sources such as content providers 402, and/or content analysis systems 403. In some examples, the media context information may be based on tags associated with the media content. The media content may be broken up into granular fragments such that the event may be associated with the content of the program at the time of the event. For example, a program could be broken into 2-second segments and each could be tagged with various metadata regarding the content of the segment. As another example, a program could be divided into each individual frame and they could be similarly tagged. The media context information may include metadata and tags associated with a fragment of the media content item, as described further below in regard to FIGS. 6A and 6B.

The media context information may be pre-determined by a content analysis system 403 within the network using facial detection techniques, scene detection techniques, topic detection techniques, and/or any other suitable techniques for assessing the nature of a portion of audiovisual content. The content analysis may be performed as part of content information platform 420, or may be performed by a separate part of the system.

The discovery platform 440 may receive event information, user context information, and/or media context information from the content information platform 420 and the subscriber information platform 430. Additionally and/or alternatively, the discovery platform 440 could receive information directly from any of data sources 401-405 and/or user devices 450. The discovery platform 440 may combine the event information with the corresponding user context information and media context information to generate detailed usage information for use in providing recommendations and personalizations to users in the network. Usage information received by the discovery platform 440 may be analyzed to determine similarities between users and/or programs and generate clusters of users and/or programs. These clusters of users and clusters of programs may be utilized by discovery platform 440 to generate targeted recommendations based on determined preferences and interests of the user and/or similar users. The usage information may be analyzed using machine-learning and/or other semantic analysis techniques to determine deep metadata 447. Deep metadata 447 may identify complex or nuanced relationships between media content items, users, clusters of users, and/or clusters of programs. For example, by processing usage information, the discovery platform 440 may identify that users in the action movie cluster enjoy scenes that have a high speed car chase involving a sports car.

The discovery platform 440 may operate to provide a wide range of recommendations and personalizations for users in the network. For example, the discovery platform 440 may generate and/or adjust menus 441 for display to the user based on the usage information of the user and/or other similar users. In some examples, the discovery platform 440 may also adjust browse results 443 and/or search results 446. The discovery platform 440 may generate content recommendations 442 to recommend specific content for viewing/consumption by the user based on determined preferences and/or tastes of the user or other similar users. Similarly, the discovery platform 440 may generate one or more personalizations 444 to adjust media content and/or interfaces provided to the user based on the preferences of the user and/or similar users. The usage information may be processed to assist in interpreting voice control commands 445 and/or other commands initiated by the user and/or similar users. Discovery platform 440 may also be integrated within a target advertisement insertion platform in order to provide recommendations as to which commercial advertisements may be inserted at particular points based on trends identified for particular clusters.

As discussed above with regard to the recommendation systems shown in FIGS. 3A and 3B, the discovery platform 440 of FIG. 4 may provide recommendations to users in various forms. For example, in some examples, the recommendation may be provided in response to a user request for recommendations and may include presenting popular and/or trending programs in a list of programs to be displayed to the user. As another example, the discovery platform 440 may determine that an emerging trend is associated with one or more clusters as determined by the real-time layer 330 and may generate recommendations based on the emerging trend. As yet another example, the discovery platform 440 may determine that a control trend within a cluster associated with the user relates to a media content item being viewed by the user. In response to detecting a control trend associated with a media content item being viewed by the user, the discovery platform 440 may provide a recommendation for adjusting visual, audio, and/or other aspects of the presentation of a media content item based on the trends, usage information, and/or preferences of the user and associated clusters. As still another example, the discovery platform 440 may select alternative content for inclusion in a presentation of a media content item based on activity of other similar users in a cluster associated with the user. For example, system may select and/or suggest a PG-rated version of a movie if a user is assigned to a family cluster. In addition to selecting and/or suggesting the PG-rated version of the movie, the system may also select and/or suggest an age appropriate commercial advertisement associated with the movie to replace an advertisement that may carry a restricted rating, e.g. as indicated by its metadata.

Similarly to the serving layer 340 of FIG. 3A, the discovery platform 440 of FIG. 4 may utilize any appropriate criteria in selecting trends and/or popular programs for use in generating the recommendation. For example, an affinity weight may be used to determine how to weight trends and programs associated with each cluster, such that trends associated with clusters more closely matched to the user's preferences and interests are more likely to be featured then trends associated with other clusters. As another example, other factors may be used in determining which cluster's associated trends and/or popular programs to use in a recommendation, such as a current time of day, day of the week, identified user, currently watched program, recently watched programs, and/or any other suitable criteria.

Having discussed data sources and information transfer between devices in a recommendation system, as shown in FIG. 4, discussion will now turn to example methods that may be utilized to implement one or more aspects of the disclosure, as shown in FIGS. 5-9.

FIGS. 5, 7A, 7B, 8A, 8B, 9A, and 9B each show an example method that may be used to implement one or more aspects discussed herein. The methods of these figures may be implemented in one or more computing devices, such as computing device 200 (FIG. 2). One or more of these methods may be implemented by a processor of the one or more computing devices, and executable instructions according to the method may be stored on a memory of the one or more computing devices. The one or more computing devices may be part of a network, such as network 109 (FIG. 1). One or more of the methods may be implemented by a discovery platform, such as discovery platform 440 of FIG. 4, or may be implemented by a system comprising one or more computing devices for managing and/or assisting the discovery platform. The process may be implemented in a network environment having multiple users and respective user devices such as set-top boxes, smart televisions, tablet computers, smartphones, and/or any other suitable access device (e.g., display device 112, gateway 111, personal computer 114, wireless device 116, etc.), or any other desired computing devices. The one or more computing devices may receive requests and send responses over the network. In one example, the methods may be implemented in a cable television network. The methods shown in FIGS. 5-9 may be implemented in an environment similar to that described above in regard to FIGS. 3A, 3B, and/or 4. The shown methods may be performed by one or more computing devices in the network. Although the steps of the methods may be described with regard to a computing device, it should be understood that the various steps of the methods may be handled by different computing devices without departing from the aspects and features described herein.

Figure 5:
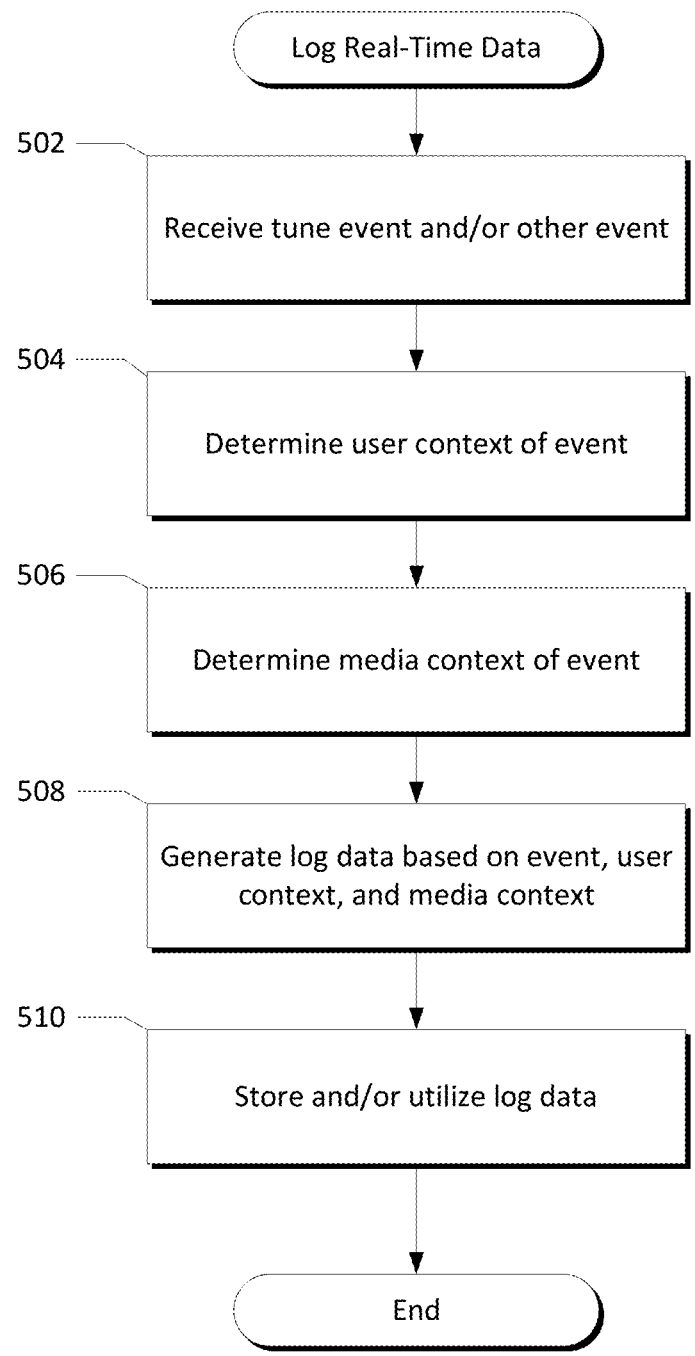
FIG. 5 shows an example method for logging real-time data according to one or more aspects discussed herein.

FIG. 5 shows an example method for logging real-time data. The example method may generate log data based on event information, user context information, and/or media context information according to aspects discussed herein. For example, the method may generate log data as described above in regards to the data ingest layer 310 of FIG. 3A.

In step 502, the computing device may receive a tune event, a control event, and/or other suitable event from a user device. Event information may be associated with control commands and other interactions between the user and his respective devices in the consumption of media content. In some examples, the computing device may receive information regarding remote control commands issued by the user to his set-top box when viewing media content on the cable network. For example, the computing device may receive event information regarding events such as: channel up, channel down, volume up, volume down, mute, last channel, opening a guide, opening program information, rewind, fast forward, replay, jump ahead, pause, stop, play, power off, power on, picture-in-picture, input switch, numerical input, and/or any other suitable commands. The event information may include additional details regarding the context of the event, such as: initial channel, final channel, time, sequence of actions, prior volume, final volume, beginning time stamp, ending time stamp, playback position, duration of pause, time since last change, and any other suitable information regarding the context of the event. Other event information may include data indicating that the user watched a certain program, how long the user watched the program, how the user arrived at the program, and any other suitable information.

In step 504, the computing device may determine a user context associated with the event. The user context may be determined based on past usage history of the user as described above and/or may be retrieved from other sources, such as a billing system and/or any suitable data source having information regarding characteristics, preferences, interests, and the like associated with the user and/or his usage. User context information may include, for example: age, gender, location, subscription level, related users, categories associated with the user, clusters associated with the user, user preferences and interests, and/or any suitable demographic information or information regarding the user's tastes and characteristics. The computing device may receive part of the user context information from the user device, third-party sources, a database maintained within the network, and/or any suitable source. Additionally and/or alternatively, the computing device may determine preferences and interests of the user based on the event and past events associated with the user.

In step 506, the computing device may determine a media context associated with the event. The media context information may be determined based on metadata and/or other information from various data sources. These data sources may include metadata data sources, content data sources, and/or content analysis systems. In some examples, the media context information may be based on tags associated with the media content. The media content may be broken up into granular fragments such that the event may be associated with the content of the program at the time of the event. For example, a program could be broken into 2-second segments and each could be tagged with various metadata regarding the content of the segment. As another example, a program could be divided into each individual frame and they could be similarly tagged. The media context information may include metadata and tags associated with a fragment of the media content item, for example relating to actors, anchors, topics, content rating, type of scene, violence, bad language, adult content, genres, and/or any other information about the content of the media item during that fragment. The media context information may be determined through use of content analysis techniques, such as facial detection techniques, scene detection techniques, topic detection techniques, and/or any other suitable techniques for assessing the nature of a portion of audiovisual content. The content analysis may be performed as a batch process prior to the logging event and/or performed as part of the logging method.

Figure 6A:
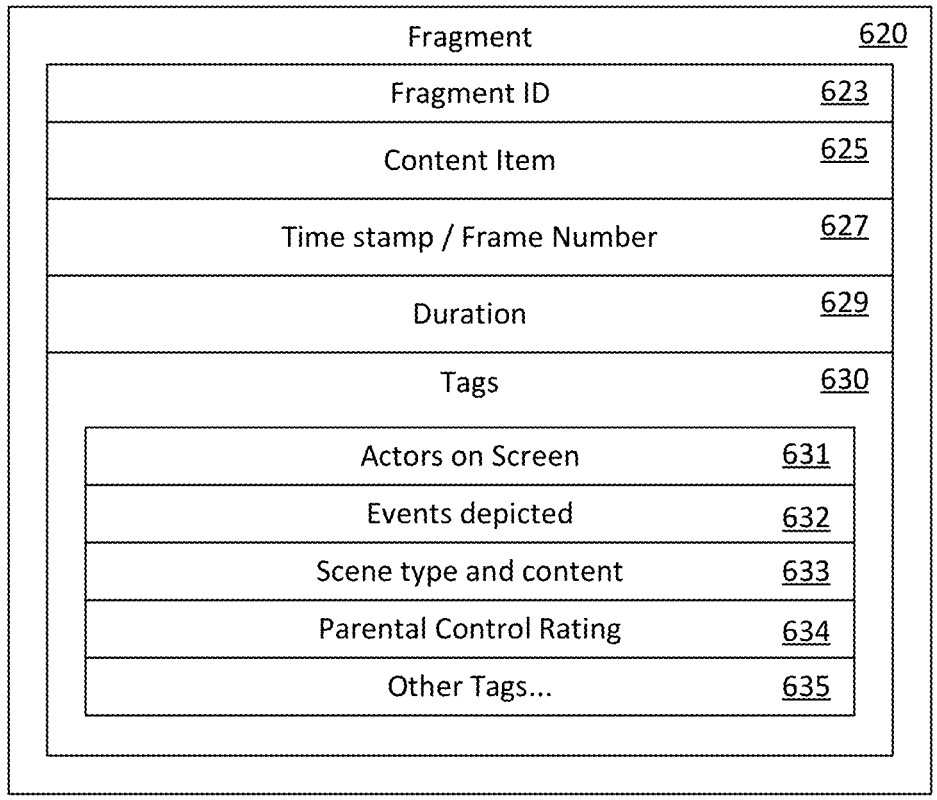
FIGS. 6A and 6B show example data structures for logging real-time data according to one or more aspects discussed herein.

FIG. 6A shows an example data structure storing media context information for a fragment of a given content item. A database storing media context information may be implemented in the network as part of the recommendation system, as part of a metadata system, as part of a program guide database, and/or in any other suitable form. In some examples, a fragment may be a small portion of a content item, such as a 2-second portion of a video. In some examples, a fragment may be a single frame of a video. Although the system may maintain an extensive data set regarding numerous tags and attributes for each content item, it should be understood that the log entry associating the event information, the media context information, and the user context information associated with a specific event may contain less than all the tags and attributes known to the system. Rather than include the entire set of tags for the fragment of the content item associated with the event, the system may determine those tags that may be most relevant based on the nature of the event and/or the user context, for example.

A fragment data record 620 may include a fragment ID 623 identifying the fragment. The fragment may be a globally unique identifier for the fragment, or may uniquely identify the fragment within the relative context of the content item. The fragment data record 620 may include a reference to the content item 625 itself, a time stamp and/or frame number 627, and a duration 629, as appropriate. For example, the data record may include a reference to the program that the fragment is a part of. The data record may also include a time stamp such as 4 minutes, 30 seconds, or a frame number such as frame 10040.

The fragment data record 620 may include a set of tags 630. These tags may be specific to the fragment itself or may be associated with the content item more generally. The tags may include metadata and other tags associated with a fragment of the media content item, for example relating to actors, anchors, topics, content rating, type of scene, violence, bad language, adult content, genres, and/or any other information about the content of the media item during that fragment. For example, the fragment data record 620 shown in FIG. 6A includes actors on screen 631, events depicted 632, scene type and content 633, parental control rating 634, and other tags 635.

A computing device in the network may generate fragment data records for fragments of media content distributed within the network. The fragment data records may be pre-generated or may be generated in real-time as events are logged. In some examples, the computing device may have access to pre-generated fragment data records having a large number of attributes and may select a subset of the attributes for inclusion in the media context information based on the event information and/or user context.

Returning to FIG. 5, in step 508 the computing device may generate a log data entry based on the event information, the user context information, and the media context information. This information may be stored by the computing device and/or caused to be stored at another computing device in the network.

Figure 6B:
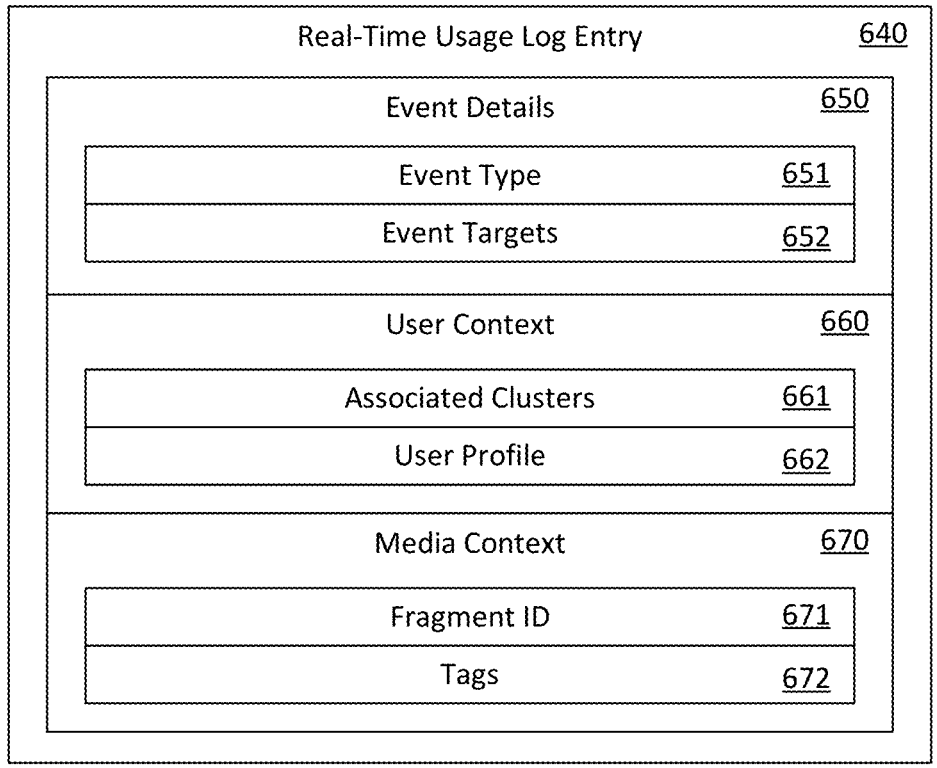

FIG. 6B shows an example data structure storing real-time usage information in a real-time usage log entry 640. The real-time usage log entry may be stored in a usage information data store and/or made available as part of a real-time data stream. For example, real-time usage information may be made available via a data stream for immediate use by a recommendation system to generate recommendations for a user based on usage events as they occur. The usage information may also be aggregated and/or stored for batch processing to generate clusters and allow for deep metadata analysis. As one example, the usage information may be aggregated in a Hadoop distributed file system in one or more databases within the network.

The log entry may include event details 650 such as event type 651 and event targets 652. Event type 651 may include the control commands associated with the user interactions, for example. Event targets 652 may include information about the prior and/or resulting state of the system, such as the starting channel and the ending channel in a channel change event, for example. Other event details may include, for example, a time of day, day of week, date, and/or any other information regarding the time, place, and/or system status associated with the event. For example, the event details may include a time of the occurrence of the event.

The log entry 640 may include user context information 660 such as an identification of the user that generated the event, which may be included in a user profile 662. The log entry may further include detailed information about the user's determined preferences and interests. This may be done by including a list of clusters associated with the user 661 and/or attributes in the user profile 662.

The log entry 640 may include media context information 670 such as a fragment ID 671 and tags 672. Fragment ID 671 may identify and/or reference a fragment data record such as that shown in FIG. 6A. Additionally and/or alternatively, log entry 640 may contain all or a portion of the information shown and described above in reference to FIG. 6A.

By combining details of the event, the user context surrounding the event, and the media context that existed at the time of the event, the log entry may enable a recommendation system to make fine-grained determinations regarding user preferences and trends. The annotated event log may be utilized by content and service providers to better analyze the popularity and effectiveness of media content delivered to users in the network. Media content may be, but is not limited to, television programming and advertisements.

Figure 7A:
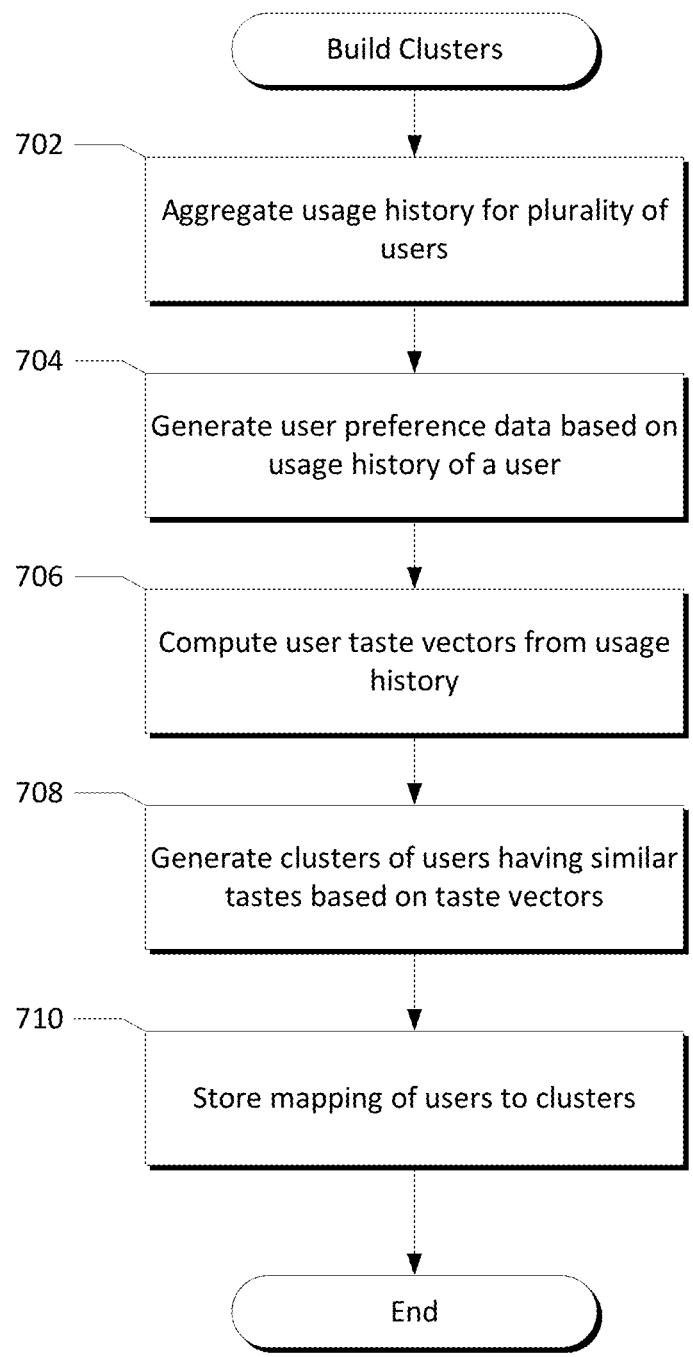
FIGS. 7A and 7B show example methods for building and adjusting clusters of users according to one or more aspects discussed herein.

FIG. 7A shows an example method for building clusters of users based on usage information, such as the real-time log entries generated by the method of FIG. 5. The shown method may compute taste vectors for individual users and generate clusters of users having similar tasters, according to aspects discussed herein. For example, the shown method may build clusters of users as described above in regards to the batch process layer 310 of FIG. 3A.

In step 702, a computing device may aggregate usage history for a plurality of users. For example, the method shown in FIG. 5 may be performed to gather real-time log data for events associated with users in a cable television network, and this log data may be aggregated using any suitable data processing techniques. In particular, log data may be aggregated using "big data" processing frameworks such as Apache Spark or Apache Hadoop. In some examples, user history data may be utilized to generate clusters of users. User history data may be read from a file and may contain information identifying a given user, programs watched, and an amount watched for each program watched. The aggregated real-time log data and/or user history data may need to be parsed and/or converted. In some examples, the processed data may be hashed and/or balanced using a hash function or weight function according to the specific clustering techniques utilized.

In step 704, the computing device may generate user preference data based on the usage history of the user. For example, the computing device may generate a user profile with information regarding preferences, interests, attributes, and the like associated with the user. The user profile data may be based on usage history of the user and/or other attributes known to the system, such as information stored in a billing and/or customer database. In some examples, the computing device may generate a matrix associating each of a plurality of users in the network with a plurality of content items. The matrix may include information regarding the user's preferences and/or consumption of the respective content items. Matrix factorization techniques may be utilized to generate the matrix from the real-time log data and/or user history data.

In step 706, the computing device may generate a plurality of user taste vectors based on the programming consumed by respective users in the network and/or events associated with the user. In some examples, this may be performed using machine learning techniques such as the Spark machine learning library. The machine learning algorithms may compute a latent taste space that represents both users and programs in a joint taste space such that inner products of user and program taste vectors is high for programs that a user has watched frequently and low for programs that the user has not watched. The latent taste space and/or joint taste space may be a semantic interpretation of a lower dimensional representation of user and program relationships and/or interactions in terms of lower dimensional inner products of vectors. For example, a matrix that may represent the interactions between M users and N users (or N programs) may be expressed in the form of a matrix with dimension M×N. This matrix may also be approximated by the product of two matrixes, a user factor matrix of dimension M×K, and/or a product factor matrix of dimension K×N, where K may be much smaller than M and/or N. The vectors of length K may be similar to each other and thus may lead to larger inner product value if a user and a product are associated with each other; however, if the vectors of length K are dissimilar and if a user and a product are not associated with each other, then smaller inner product value may result. Machine learning, specifically matrix factorization algorithms, may be employed to compute the user and product factor matrices that may be best approximations of the user product interaction matrix in association with and/or based on an error metric. The vectors of length K may be determined to be similar if their respective lengths are within a threshold tolerance of each other.

For example, the content items may comprise movies such as the Matrix, Alien, Serenity, Casablanca, and the Notebook. In the example, the users may comprise User A, User B, and User C. After matrix factorization, which may include the use of a confidence matrix and a user preference matrix, the product may result in taste vectors for each of the users in association with the movies. For example, after matrix factorization, User A may have a taste vector reflected by [90 89 93 15 0] showing that (on a scale of 0-100, where 0 denotes no affinity for a content item and 100 denotes the highest affinity score for a content item) User A has affinity scores of 90, 89, 93, 15, and 0 respectively for the Matrix, Alien, Serenity, Casablanca, and the Notebook. These affinity scores may be represented in several ways, such as percentages, binary ones and zeros, viewing frequency, and/or any other scoring framework. For example, using a binary framework, User A's taste vector may be [1 1 1 0 0] for the same movies, where a threshold may be used to convert affinity scores into binary.

Continuing with the example above, User B may have a taste vector [91 88 0 0 5] and User C may have a taste vector [0 0 0 0 98] respectively for the example set of movies. When selecting the content items (e.g. movies) to serve as the baseline for the taste vectors, the computing device may use content items that satisfy a predetermined probability threshold of being available to each user, e.g. an availability threshold. For example, a content item (e.g. Alien) may have been shown as primary programming (e.g. shown 5 times a day, every day for three months) on a network in User A and User B's regions. However, Alien may have only been shown once in User C's region during the same and/or equivalent period. If 1,000 other content items were shown in User C's region during the same and/or equivalent period, the computing device may determine that the probability of User C viewing Alien was 1 out of 1,000, which might not satisfy the predetermined probability threshold, e.g. availability threshold. In such a case, the computing device may decide to avoid using Alien in the factorization of taste vectors for Users A, B, and C. Thus, in developing taste vectors, the computing device may decide to only use content items that satisfy an availability threshold for each user. Other factors may be used in conjunction with the availability threshold, such as time and geographic regions. The use of the example set of movies and Users A, B, and C above is for example purposes and was not meant to be limiting. The system may handle any number of users and any type of audio and/or visual content items.

In step 708, the computing device may use the taste vectors to generate clusters of users having similar tastes. A clustering algorithm may be utilized that receives the taste vectors for a plurality of users as input and outputs a plurality of clusters grouping subsets of those users together based on the frequency with which the users consume similar content. In some examples, the clustering algorithm may iteratively assign points in the taste space to clusters based on the taste vectors computed for each user based on the user-program matrix referenced above. The algorithm may determine a logical closeness between a user and a cluster based on taste vectors associated with the user and users that are in the cluster. Based on the closeness between a user and a cluster, the algorithm may assign users to one or more clusters and update the characteristics of the cluster. The algorithm may then iteratively repeat until the clustering converges to a stable solution. In some examples, before or as part of the clustering step, the taste vectors can be pre-processed and/or normalized to a uniform length. Pre-processing may be implemented, for example, using a dimensionality reduction technique such as singular value decomposition. Pre-processing and normalization may improve the quality of the clusters that are generated in step 708.

In other examples, the clustering algorithm may determine an approximate taste vector for each cluster that is representative of an average taste vector for the cluster. Then, the algorithm may determine proximity between a user and a cluster based on taste vectors for the user and the approximate taste vector for the cluster. The algorithm may determine proximity in any number of ways. For example, each element of a user's taste vector (e.g. [80, 77, 90, 0 0]) may be respectively compared to each element of the approximate taste vector for the cluster (e.g. [90 80 88 5 0]) to determine standard deviations, threshold difference values, matrix factors, etc. For example, the computing device may determine a difference between each respective element of the user taste vector and the approximate taste vector. The computing device may decide that, in order to satisfy a logical closeness for a cluster, a predetermined amount of vector elements should have differences that satisfy a maximum threshold value. In the example above, the difference between the user's taste vector and the approximate taste vector may result in a difference vector [10 3 2 5 0]. If the predetermined amount of vector elements is three and the threshold difference value is 30, then the computing device may decide to select the user for inclusion in this cluster because all five of the vector elements fall within the maximum threshold value of 30. In addition, any taste vectors and/or taste representations herein may be combined with user context information, e.g. demographic data, in order to generate recommendations for targeted and/or personalized commercial advertisements.

In step 710, the computing device may store a mapping associating each of the plurality of users with one or more clusters based on the determined preferences and/or interests of the users and other users in the clusters.

Figure 7B:
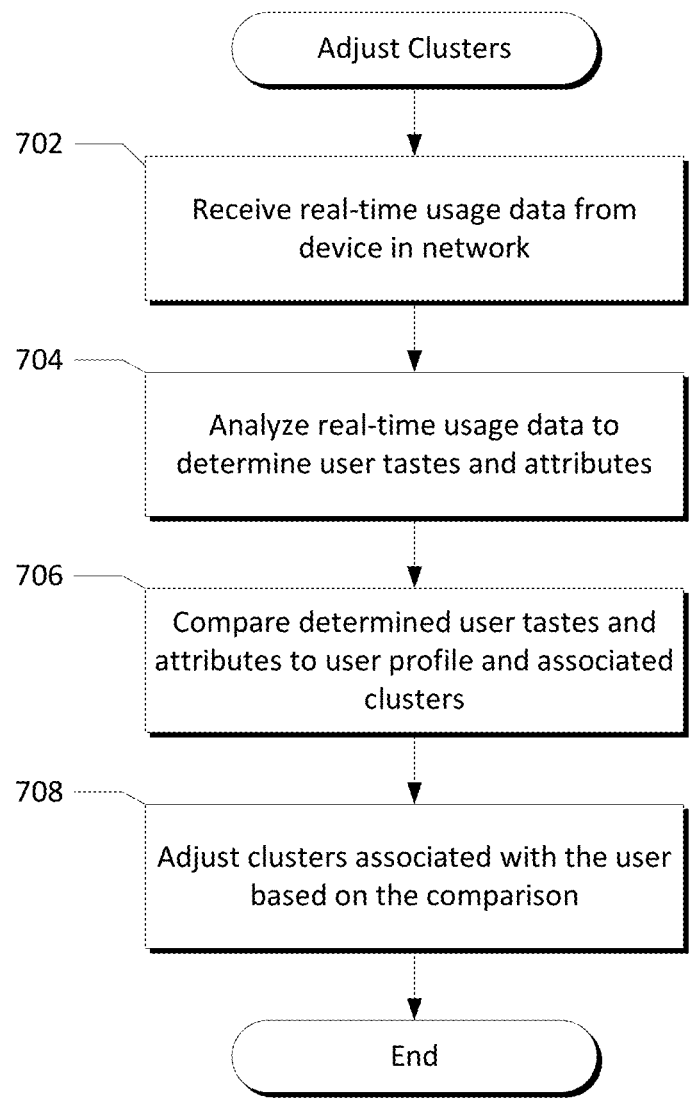

FIG. 7B shows an example method for adjusting clusters of users built in FIG. 7A. The computing device may determine that a user's relationship to one or more clusters should be adjusted based on analyzing the real-time usage of the user and/or other users in the cluster. The clusters may have been generated as part of batch processing of usage data for users in the network, and adjustments according to the method of FIG. 7B may be made dynamically based on real-time usage information, according to some aspects described herein. The real-time usage information may be associated with usage information for a current session of the user, such as usage information since the user turned on an access device, usage information within a predetermined time period, usage information since the last batch processing, and the like. For example, the shown method may adjust clusters of users as described above in regards to the real-time layer 320 of FIG. 3A.

In step 702, the computing device may receive real-time usage data from a device in the network associated with a user. The real-time usage data may include real-time log entries as discussed above with respect to FIGS. 5, 6A, and 6B.

In step 704, the computing device may determine user tastes, interests, and the like associated with the user based on the real-time usage data. For example, the system may determine that the real-time usage data indicates that the user has a preference for watching reality TV programs.

In step 706, the computing device may compare the determined user tastes, interests, and the like to a user profile associated with the user and/or clusters associated with the user. In step 708, the computing device may adjust the user profile or a relationship between the user and a cluster based on the comparison. Additionally and/or alternatively, the computing device may adjust the attributes of a cluster based on real-time usage information of users in the cluster. In some examples, if the comparison suggests that the determined user taste reinforces, supplements, undermines, or otherwise may adjust an attribute of the user profile, the computing device may update the user profile accordingly. For example, if the user profile includes an attribute indicating that the user has a moderate interest in sports and the real-time usage data suggests that the user is watching more sports programs, the user profile may be updated to reflect a stronger interest in sports programming. As another example, if the user profile indicates that the user has no interest or an unknown interest in reality TV and the real-time usage data suggests that the user is watching more reality TV programs, the user profile may be updated to include an attribute regarding the user's interest in reality TV programs.

Similarly, if the comparison suggests that the determined user taste reinforces, supplements, undermines, or otherwise informs a relationship between a user and an associated cluster, the computing device may update the relationship accordingly. For example, the computing device may add an association between the user and a sport fan cluster when the real-time usage data indicates that the user is consuming a large amount of sport programming. As another example, the computing device may move the user from a late night television cluster to a family cartoon cluster when the real-time usage data indicates that the user has been tuning to Saturday morning cartoons. As yet another example, if the real-time usage data indicates that sport fans are frequently tuning to a particular sport program, the attributes of the sport fan cluster may be adjusted to reflect a change in the taste of the cluster and the users that are members of the cluster.

Figure 8A:
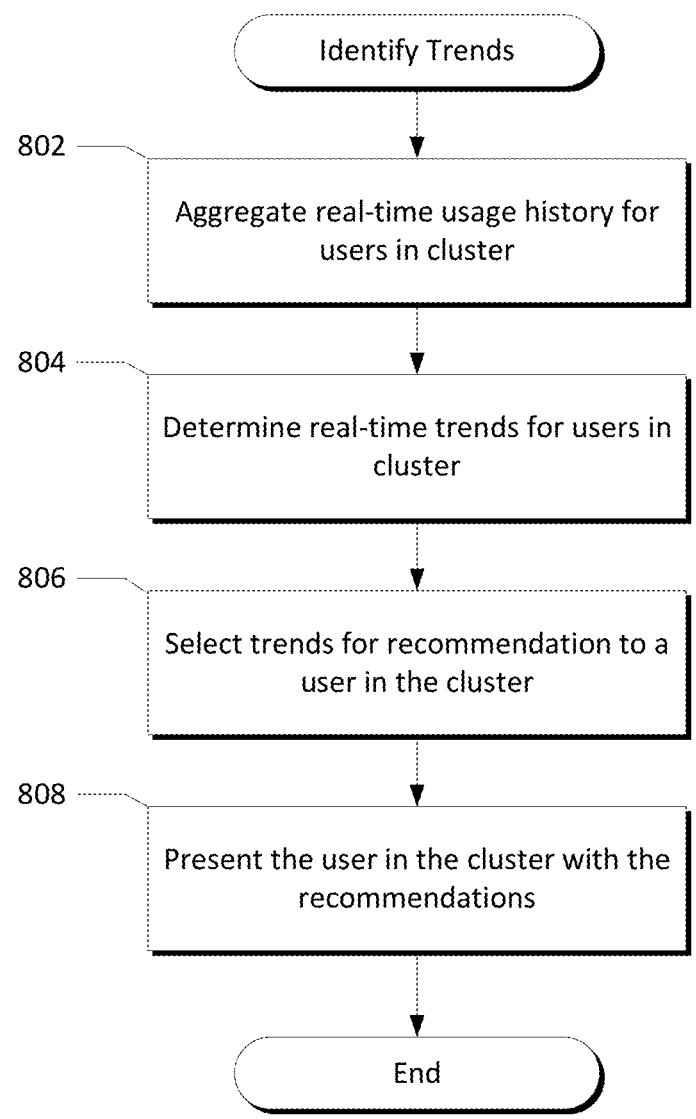
FIGS. 8A and 8B show example methods for identifying trends associated with a cluster of users according to one or more aspects discussed herein.

FIG. 8A shows an example method for identifying trends based on the real-time usage data for users in a cluster. A computing device may monitor real-time usage information of the users in a cluster and use this information to generate recommendations for other users in the cluster. For example, the shown method may detect trends and generate recommendations for users as described above with regard to real-time layer 330 and serving layer 340 of FIG. 3A.

In step 802, a computing device may aggregate real-time usage history for users in a cluster. For example, the method shown in FIG. 5 may be performed to gather real-time log data for events associated with users in a cable television network, and this log data may be aggregated using any suitable data processing techniques. In particular, log data may be aggregated using "big data" processing frameworks such as Apache Spark.

In step 804, the computing device may determine real-time trends for users in a cluster. The computing device may determine one or more trends for various clusters in the system based on usage events associated with users in the clusters, as described above in regard to real-time layer 330 of FIG. 3A. These trends may be used to generate recommendations for users. The computing device may implement machine-learning and/or other semantic analysis techniques to determine trending actions within a given cluster of users. In some examples, the computing device may analyze the programs being viewed by users in each cluster and/or their relative popularity within each respective cluster. In other examples, the computing device may analyze the events generated by users in a cluster to determine the existence of a control trend within the cluster. In still other examples, the computing device may analyze the events generated by users in a cluster to identify an emerging trend within the cluster. The computing device may use any suitable criteria to identify existing and/or emerging trends within the cluster of users. For example, the computing device may assess whether a threshold number of users have participated in the trend and/or whether a rate of change of the number of users initiating a particular command exceeds a threshold rate. As another example, the system may determine that a trend exists when a threshold number of users initiate a command within a set period of time, such as within the last five minutes. Similarly, the computing device may identify trends associated with a content item based on the usage history of users currently who are currently viewing or have viewed the content item. Additionally and/or alternatively, trends associated with a content item may be detected based on trends associated with related and/or similar content items.

In step 806, the computing device may select trends for recommendation to a user in a cluster associated with the trend. For example, the computing device may utilize the trend information generated in step 804 and the cluster information generated by the method shown in FIG. 5 to generate recommendations and personalizations for a user. When the user takes an action that requests recommendations, such as by selecting to view a list of popular programs, the computing device may determine recommendations for the user based on trends within one or more clusters associated with the user. Another form of recommendations may include adding, removing, and/or adjusting items from a list of content items displayed to the user. For example, when the user searches for a given term, standard results may be reorganized and enhanced based on the activity of similar users. The user may take other actions that do not expressly request recommendations, such as performing a search, and still be provided with recommendations. For example, when a user searches for a term, the user may be presented with results based at least in part on popular programs within one or more clusters associated with the user.

In response to a user request for recommendations, the computing device may look up one or more clusters associated with the user based on the real-time usage history and/or historical usage information. The computing device may determine whether any trends or popular programs were identified in step 804 associated with the one or more clusters. The computing device may generate a recommendation for the user based on the trends and/or popular programs associated with the clusters. The computing device may utilize any appropriate criteria in selecting trends and/or popular programs for use in generating the recommendation. For example, the computing device may assess an affinity weight to determine how to weight trends and programs associated with each cluster, such that trends associated with clusters more closely matched to the user's preferences and interests are more likely to be featured then trends associated with other clusters. As another example, the computing device may utilize other factors in determining which cluster's associated trends and/or popular programs to use in a recommendation, such as a current time of day, day of the week, identified user, currently watched program, recently watched programs, and/or any other suitable criteria.

In step 808, the computing device may generate a recommendation for the user and/or present the user with the recommendation based on his relationship to the cluster associated with the trend. In some examples, the computing device may generate recommendations based on an emerging trend associated with the cluster. For example, if the emerging trend is that sport fans are tuning to a football game as overtime starts, the computing device may look up users that are in the sport fan cluster and recommend that they tune to the game. In some examples, the computing device may generate a notification regarding the recommendation that the user tunes to the game and may cause the notification to be displayed on the user's screen. The notification may be operable by the user to tune his set-top box to the game to catch the exciting moments. In other examples, the computing device may automatically implement the recommendation by tuning the user to game. The system may determine to automatically implement a recommendation where the strength of the recommendation is very strong, such as where a higher threshold number of users have tuned to the game. Additionally and/or alternatively, the user may opt-in/opt-out of automatic implementation of suggestions through a user preference or setting. In some examples, an indication may be displayed informing the user that an automatic recommendation has been implemented. In addition and/or the alternative, extracted metadata from closed captioning may serve as the basis for identifying that a sports game went into overtime. This extracted metadata may serve as the basis for transmission of a notification for display.

Figure 8B:
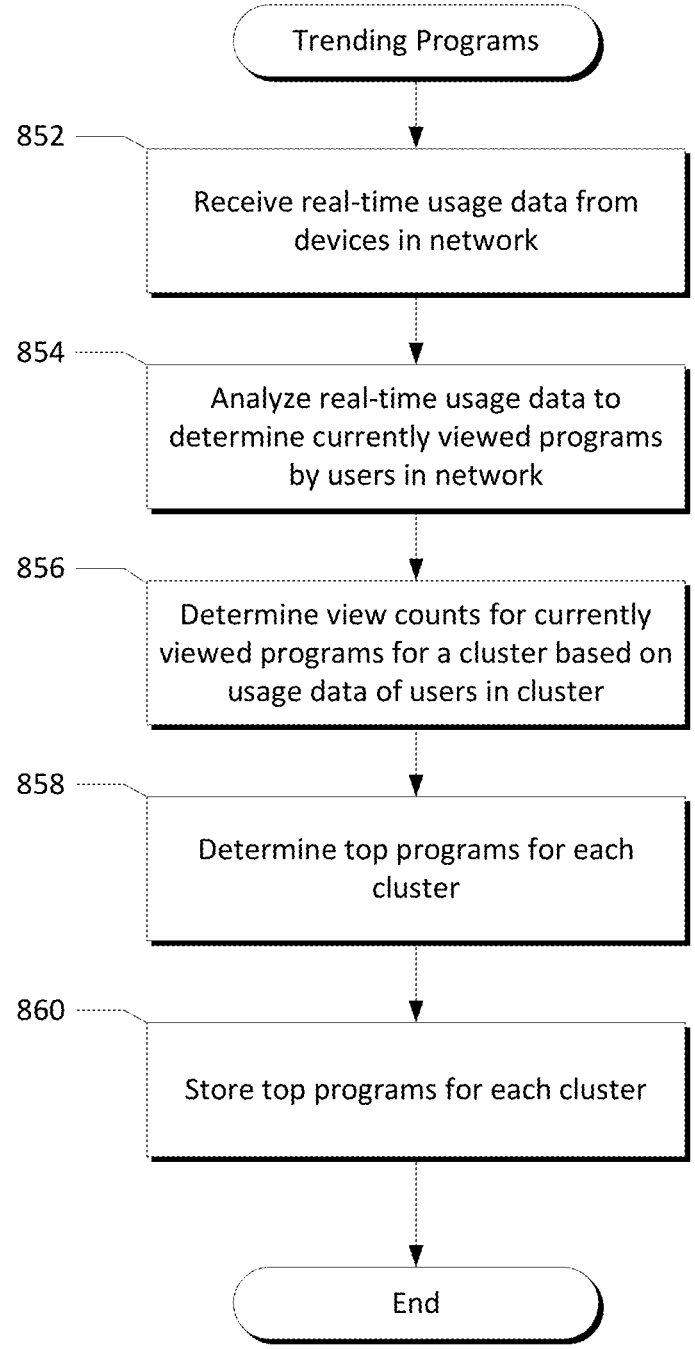

FIG. 8B shows an example method for determining trending programs within a cluster. In step 852, a computing device may receive real-time usage data from device in a network. The real time usage data may include real-time log entries such as those generated by the method shown in FIG. 5.

In step 854, the computing device may analyze the real-time usage data to determine programs currently viewed by users in the network. In some examples, real-time tune events may be retrieved from a messaging platform that processes the real-time usage data, and the real-time tune events may be used by the computing device to determine view counts for programs in the network. The real-time tune events may be parsed based on a type of tune event, such as a tune to a channel (e.g. a cable tune), a tune to a recorded program (e.g. a DVR tune), a tune to a video on demand asset (e.g. a VOD tune), and/or any other type of tune event. The tune events may be stored by the system as real-time log data having information about the user that initiated the tune command, the station tuned to, the program tuned to, a designated market area associated with the user, and the tune type, for example.

The real-time tune events may be used to update data for each user regarding what station and/or content asset the user is currently viewing. If a user has been inactive for a threshold duration, the computing device may mark the user as inactive and may ignore that user's current selection in further processing.

In step 856, the computing device may determine view counts for currently viewed programs for a cluster based on usage data of the users in the cluster. For example, each real-time tune command may include a user mapped to one or more clusters. The mapping may be used to update a popularity count and/or rating of a given content item relative to the cluster based on the activity of users in the cluster tuning to and/or away from the content item.

In step 858, the computing device may determine the top program for each cluster. In some examples, the computing device may determine a fixed number of top programs for each cluster, such as the top 20 programs or the top 1000 programs. One or more big data processing platforms may be utilized to facilitate efficient counting of the top programs for each cluster. For example, the Algebird library provided by Twitter may be used to count top programs for each cluster. In step 860, the top programs for each cluster may be stored and used for generating recommendations as described herein.

Figure 9A:
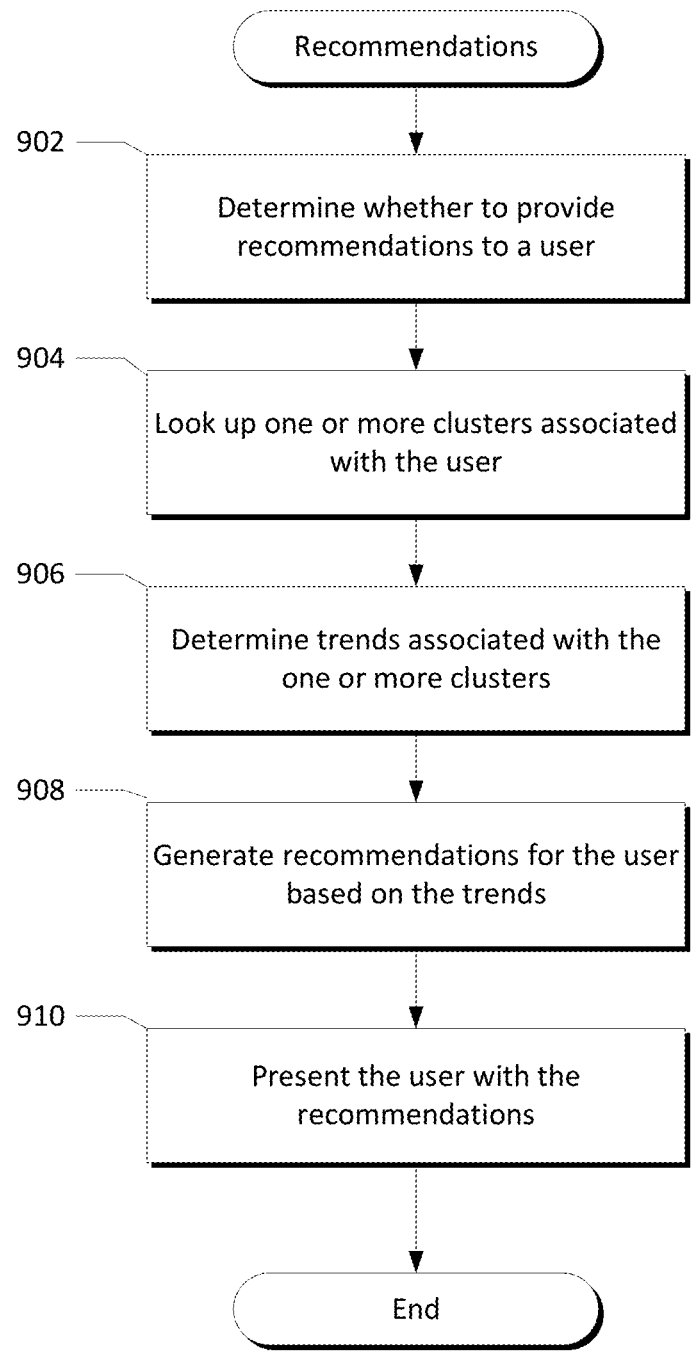
FIGS. 9A and 9B show example methods for providing recommendations to users based on clusters associated with the users according to one or more aspects discussed herein.

FIG. 9A shows an example method for generating recommendations for a user in response to a user request for recommendations. A computing device may monitor real-time usage information of the users in a cluster and use this information to generate recommendations for other users in the cluster. For example, the shown method may detect trends and generate recommendations for users as described above with regard to serving layer 340 of FIG. 3A.

In step 902, the computing device may determine whether to provide recommendations to a user. When the user takes an action that requests recommendations, such as by selecting to view a list of popular programs, the computing device may determine recommendations for the user based on trends within one or more clusters associated with the user. The computing device may also determine to provide recommendations when the user initiates a search and/or browse command. For example, when the user searches for a given term, standard results may be reorganized and enhanced based on the activity of similar users. The user may take other actions that do not expressly request recommendations, such as performing a search, and still be provided with recommendations. For example, when a user searches for a term, the user may be presented with results based at least in part on popular programs within one or more clusters associated with the user.

In step 904, the computing device may look up one or more clusters associated with the user. For example, in response to a user request for recommendations, the computing device may look up one or more clusters associated with the user based on data generated by the method shown in FIG. 5.

In step 906, the computing device may determine one or more trends associated with the one or more clusters. For example, the computing device may assess whether any trends or popular programs are associated with the one or more clusters based on data generated by the methods described in FIGS. 8A and 8B.

In step 908, the computing device may generate recommendations for the user based on the determined trends. For example, the computing device may generate a recommendation for the user based on the trends and/or popular programs associated with the clusters. The computing device may utilize any appropriate criteria in selecting trends and/or popular programs for use in generating the recommendation. For example, the computing device may assess an affinity weight to determine how to weight trends and programs associated with each cluster, such that trends associated with clusters more closely matched to the user's preferences and interests are more likely to be featured then trends associated with other clusters. As another example, the computing device may utilize other factors in determining which cluster's associated trends and/or popular programs to use in a recommendation, such as a current time of day, day of the week, identified user, currently watched program, recently watched programs, and/or any other suitable criteria.

In step 910, the computing device may present the user with the recommendations as described in the examples set forth above.

Figure 9B:
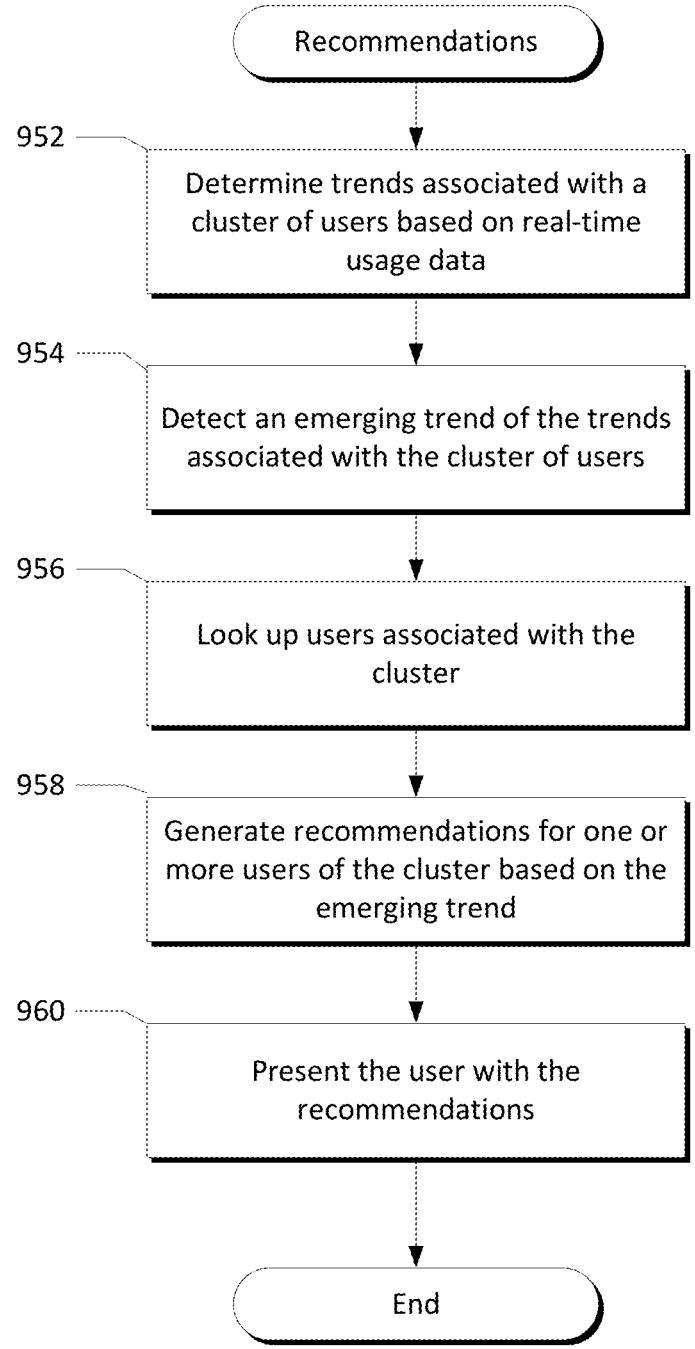

FIG. 9B shows an example method for generating recommendations for users in response to detecting trends associated with a cluster of users. A computing device may detect an emerging trend associated with one or more clusters of users and may generate recommendations based on the emerging trend for other users in the cluster. For example, the shown method may detect an emerging trend and/or a control trend and generate recommendations for users as described above with regard to serving layer 340 of FIG. 3A. In step 952, the computing device may determine trends associated with a cluster of users based on real-time usage data.

In step 954, the computing device may analyze the events generated by users in a cluster to identify an emerging trend within the cluster. For example, the computing device may detect a spike in the number of users in a cluster that tune to a particular channel. This may indicate, for example, that something exciting to those users is taking place on that channel. The computing device may use any suitable criteria to determine if an emerging trend is occurring within the cluster, such as by detecting a threshold number of similar events within a fixed time period and/or by determining that a rate of change of the number of users in the cluster tuning to that channel exceeds a threshold level. In step 956, based on detecting an emerging trend in a cluster of users, the computing device may look up users associated with the cluster.

In step 958, the computing device may generate recommendations for users in the cluster, and in step 960 the computing device may present the users with the recommendations. For example, the system may notify users that are have not tuned to a game that other users in the cluster are tuning to a game. In some examples, the computing device may generate a notification regarding the recommendation that the user tunes to the game and may cause the notification to be displayed on the user's screen. The notification may be operable by the user to tune his set-top box to the game to catch the exciting moments. In other examples, the computing device may automatically implement the recommendation by tuning the user to game. The system may determine to automatically implement a recommendation where the strength of the recommendation is very strong, such as where a higher threshold number of users have tuned to the game. Additionally and/or alternatively, the user may opt-in/opt-out of automatic implementation of suggestions through a user preference or setting. In some examples, an indication may be displayed informing the user that an automatic recommendation has been implemented.

Although aspects described herein generally discuss a user in the content network and his respective devices, it should be understood that the features described herein may be applied to provide recommendations for multiple users associated with a single device and/or account. The system may maintain multiple user profiles for each device and/or account, and may shift between which user profile is utilize for a given session based on real-time usage data received from the device. For example, the system may have an adult profile and a children profile for a single account. The system may detect that the user is selecting sports programs and late night television, and may determine that the user associated with the adult profile is using the system. Similarly, the system may detect that the user is selecting children's programming and may determine that the user associated with the children profile is using the system. Users may also be provided an opportunity to manually sign in and/or indicate which member of the household is using the system. Other factors, such as the time of day or the day of the week, may be used to determine which member of the household is using the system.

Through maintaining a profile of the preferences and interests of a user, the system may be able to better build profiles and other metadata for new content in the network. For example, is a new program is made available, the system may detect that sport fans or reality TV users are very interested in the program based on analyzing the real-time usage information and may tag the program accordingly.

According to some aspects, the system may build a list of loyal viewers associated with a program or series based on analyzing the real-time data. For example, the system may generate a cluster of users that regularly tune in to "The Voice" every week. The real-time usage data of these users may reflect that they are a member of the loyal viewers of that program. As a result, content and service providers may be able to analyze trends across loyal viewers of the program to determine the ongoing popularity of content with the users most likely to tune in each week. This data may allow programmers to filter logs for events associated with loyal viewers and may provide valuable insights. For example, it may be more significant when a long-time loyal viewer tunes away from a program than when a one-time browser tunes away from the program.

Many other applications and/or features may be implemented and/or realized using the contextualized event information (such as event information combined with media context information and user context information). For example, analysts may access the event information to detect when a commercial is starting to lose its impact on customers. As users begin to tune away from a commercial earlier in its durations, an analyst or automated process may determine that a new commercial should be introduced to the broader viewing public and/or directly targeted to specific clusters of users. As another example, contextualized event information may be useful for comparing the effectiveness of two commercials based on how long each is able to retain user attention.

Other examples may include tracking the popularity of individual actors and anchors. For example, usage information provided by the system as described herein may be utilized to track a number of viewers and/or other metrics associated with particular actors and/or anchors, in some examples. Similarly, a change in popularity among actors and/or anchors may be observed based on the stored data and used to determine whether to continue including programming with a given actor.

Techniques described herein may be applied to real-time event information regarding how the user interacts with programs recorded on a digital video recorder, for example. The real-time event information may track when a user plays, pauses, stops, rewinds, fast-forwards, jumps back, and jumps forward during playback of a recorded content item. This event information may be similarly combined with user context information and media content context information for use in the clustering and analytic techniques described herein. For example, knowing the scene content may help an analyst determine why a user or group of users fast-forwarded through a scene. Media content as described herein may include, but is not limited to, television programming, on-demand video, and/or advertisements.

Attached hereto as Appendix A is a presentation that provides additional examples of implementations according to one or more aspects described herein. The content of Appendix A is expressly incorporated herein.

Although examples are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
    determining, by a computing device, an association between a user device and a plurality of other devices;
    determining, by the computing device and based on user inputs received at the plurality of other devices during output of a content item, a recommendation for the user device to alter audio of the content item, wherein the user inputs comprise at least one user input requesting to alter the audio of the content item by altering audio volume at a selected time point in the content item; and
    causing, by the computing device and during output of the content item at the user device, output of a notification indicating the recommendation and comprising an option for the user device to alter, in accordance with the recommendation, the audio volume at the selected time point in the content item.

2. The method of claim 1, wherein the user inputs comprise at least one user input requesting, during the output of the content item, to alter a playback speed of the content item by fast-forwarding to a second time point in the content item, and
    the method further comprises causing, during the output of the content item at the user device, output of another notification comprising an option to fast-forward the content item to the second time point.

3. The method of claim 1, wherein the user inputs comprise at least one user input requesting, during the output of the content item, to alter a playback location of the content item by replaying a portion of the content item, and
    the method further comprises causing, during the output of the content item at the user device, output of another notification comprising an option to replay the portion of the content item during the output of the content item at the user device.

4. The method of claim 1, wherein determining the association between the user device and the plurality of other devices comprises determining that the plurality of other devices have outputted the content item.

5. The method of claim 1, wherein the user device has enabled automatic alterations, of the audio of the content item, during the output of the content item, and
    wherein the method further comprises causing automatically altering, on the user device, the audio of the content item.

6. The method of claim 1, wherein causing output of the notification is further based on:
    determining that a quantity of devices, of the plurality of other devices, have altered the audio of the content item; and
    determining that the quantity of devices satisfies a threshold value.

7. A method comprising:
    receiving, by a computing device and from a plurality of user devices, usage event data indicating user inputs that alter a playback speed of a content item, a playback location of the content item, or audio of the content item;
    determining, by the computing device, that a user device:
        is a member of the plurality of user devices; and
        has enabled automatic alterations, at the user device, of the playback speed of the content item, the playback location of the content item, or the audio of the content item; and
    causing, by the computing device, at the user device, and based on the usage event data, automatic altering of the playback speed of the content item, the playback location of the content item, or the audio of the content item at a time location that is based on determining that the plurality of user devices previously started the altering at the time location.

8. The method of claim 7, wherein causing automatic altering of the playback speed of the content item at the user device comprises:
    determining, from the usage event data, a plurality of fast-forward commands that were received at the plurality of user devices; and
    causing, based on the determined plurality of fast-forward commands and during output of the content item at the user device, fast-forwarding of a portion of the content item.

9. The method of claim 7, wherein causing automatic altering of the playback location of the content item at the user device comprises:
    determining, from the usage event data, a plurality of replay commands that were received at the plurality of user devices; and
    causing, based on the determined plurality of replay commands and during output of the content item at the user device, replaying of a portion of the content item.

10. The method of claim 7, wherein causing automatic altering of the playback location at the user device comprises:
    determining, from the usage event data, a plurality of skip commands that were received at the plurality of user devices; and
    causing, based on the determined plurality of skip commands and during output of the content item at the user device, skipping of a portion of the content item.

11. The method of claim 7, wherein causing automatic altering of the audio of the content item at the user device comprises:
    determining, from the usage event data, a plurality of volume changes that were received at the plurality of user devices; and
    causing, based on the determined plurality of volume changes and during output of the content item at the user device, adjusting of a volume.

12. A method comprising:
    receiving, by a computing device and from a plurality of user devices, information indicating remote control inputs associated with a content item;
    determining, by the computing device and based on the information, that a quantity of user devices, of the plurality of user devices, have altered a playback speed of the content item, a playback location of the content item, or audio of the content item;

determining, by the computing device, that a user device is outputting the content item and is a member of the plurality of user devices; and based on determining that the quantity of user devices satisfies a threshold value and while the user device is outputting the content item, sending, by the computing device and to the user device, a message comprising an option to alter the playback speed of the content item, the playback location of the content item, or the audio of the content item.

13. The method of claim 12, wherein sending the message comprises sending an option to adjust a volume of the content item at the user device based on determining that the remote control inputs comprise a threshold quantity of corresponding volume adjustments.

14. The method of claim 12, wherein sending the message comprises sending an option to fast-forward a portion of the content item at the user device based on determining that the remote control inputs comprise a threshold quantity of corresponding fast-forward functions associated with the portion of the content item.

15. The method of claim 1, wherein the user inputs comprise at least one user input requesting, during the output of the content item, to alter a playback speed of the content item by rewinding to a second time point in the content item, and the method further comprises causing, during the output of the content item at the user device, output of another notification comprising an option to rewind the content item to the second time point.

16. The method of claim 12, wherein sending the message comprises sending an option to mute the audio of a portion of the content item at the user device based on determining that the remote control inputs comprise a threshold quantity of corresponding mute functions associated with the portion of the content item.

17. The method of claim 7, wherein determining that the user device is the member of the plurality of user devices further comprises determining that the plurality of user devices have outputted the content item.

18. The method of claim 1, wherein determining the recommendation comprises determining that the plurality of other devices have altered, for a duration, the audio of the content item, and wherein causing output of the notification indicating the recommendation comprises causing output of the notification indicating the duration.

19. The method of claim 1, wherein the at least one user input requesting to alter the audio of the content item comprises a request to mute the audio of the content item at the selected time point in the content item, and wherein causing output of the notification indicating the recommendation comprises causing, during the output of the content item at the user device, output of an option to mute the audio of the content item at the selected time point.

20. The method of claim 12, wherein sending the message comprises sending an option to replay a portion of the content item at the user device based on determining that the remote control inputs comprise a threshold quantity of corresponding replay commands associated with the portion of the content item.

* * * * *

UNITED STATES PATENT AND TRADEMARK OFFICE
CERTIFICATE OF CORRECTION

| | |
|---|---|
| PATENT NO. | : 11,290,783 B2 |
| APPLICATION NO. | : 15/073214 |
| DATED | : March 29, 2022 |
| INVENTOR(S) | : Jan Neumann et al. |

It is certified that error appears in the above-identified patent and that said Letters Patent is hereby corrected as shown below:

In the Specification

Detailed Description, Column 5, Line 51:
After "users", please insert --.--

Detailed Description, Column 11, Line 42:
Delete "lawyer" and insert --layer--

Detailed Description, Column 19, Line 15:
Delete "316." and insert --315.--

Detailed Description, Column 19, Line 37:
Delete "343" and insert --316--

Detailed Description, Column 20, Line 8:
Delete "headed" and insert --headend--

Detailed Description, Column 24, Line 62:
Delete "10040." and insert --627.--

Detailed Description, Column 28, Line 65:
Delete "320" and insert --330--

Signed and Sealed this
Fifteenth Day of August, 2023

Katherine Kelly Vidal
*Director of the United States Patent and Trademark Office*